(12) United States Patent
Ikeda et al.

(10) Patent No.: US 11,992,765 B2
(45) Date of Patent: May 28, 2024

(54) COMPUTER SYSTEM AND GAME SYSTEM

(71) Applicant: BANDAI NAMCO ENTERTAINMENT INC., Tokyo (JP)

(72) Inventors: Kohei Ikeda, Kawasaki (JP); Ryo Saito, Tokyo (JP); Takeshi Hida, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 320 days.

(21) Appl. No.: 17/336,781

(22) Filed: Jun. 2, 2021

(65) Prior Publication Data

US 2021/0283504 A1 Sep. 16, 2021

Related U.S. Application Data

(63) Continuation of application No. PCT/JP2020/030590, filed on Aug. 11, 2020.

(30) Foreign Application Priority Data

Oct. 25, 2019 (JP) .................................. 2019-194712

(51) Int. Cl.
*A63F 13/56* (2014.01)
*A63F 13/833* (2014.01)

(52) U.S. Cl.
CPC ............ *A63F 13/56* (2014.09); *A63F 13/833* (2014.09)

(58) Field of Classification Search
CPC ..... A63F 13/56; A63F 13/833; A63F 13/5375
See application file for complete search history.

(56) References Cited

U.S. PATENT DOCUMENTS

| 2011/0244959 | A1* | 10/2011 | Inagaki | G06V 40/28 463/31 |
| 2019/0212106 | A1* | 7/2019 | Bortz | F41A 33/02 |
| 2020/0155926 | A1* | 5/2020 | Miki | A63F 13/245 |
| 2023/0205608 | A1* | 6/2023 | Emberling | G06F 9/522 718/102 |

FOREIGN PATENT DOCUMENTS

| JP | 2006-141665 A | 6/2006 |
| JP | 2019-097870 A | 6/2019 |

OTHER PUBLICATIONS

Oct. 27, 2020 International Search Report issued in International Patent Application No. PCT/JP2020/030590.

* cited by examiner

*Primary Examiner* — Steve Rowland
(74) *Attorney, Agent, or Firm* — Oliff PLC

(57) ABSTRACT

A computer system detects occurrence of an action exchange in which one of a player character and an opponent character performs a first action and another one of the player character and the opponent character performs a second action to mutually exchange the actions. Based on a first stiff time related to the first action, a second stiff time related to the second action, and a time difference between the first stiff time and the second stiff time, when a stiff time (hereinafter referred to as an "own stiff time") related to an action performed by the player character is shorter than a stiff time related to an action performed by the opponent character, the computer system presents a player controlling the player character with a recommended candidate action recommended to be performed after an end of the own stiff time.

19 Claims, 22 Drawing Sheets

COMPUTER SYSTEM AND GAME SYSTEM

CROSS REFERENCE TO RELATED APPLICATION

This application is a continuation of International Patent Application No. PCT/JP2020/030590, having an international filing date of Aug. 11, 2020, which designated the United States, the entirety of which is incorporated herein by reference. Japanese Patent Application No. 2019-194712 filed on Oct. 25, 2019 is also incorporated herein by reference in its entirety.

BACKGROUND

Games such as racing games, fighting games, or spots games require a player to select and input an appropriate type of operation input at an appropriate timing. In order to have a good score, the player needs ability to instantly perceive an appropriate timing in gameplay and skill to quickly and accurately perform operation input. However, acquiring these ability and skill is difficult, and thus game players admire and desire to be a high-level player sufficiently having these ability and skill.

Game developers develop a user support function to realize such a desire of users. For example, Japanese Unexamined Patent Application Publication No. 2006-141665, relating to a racing game for driving in a racing circuit, discloses a technique to store play data describing play progress of the game in time series for each player, and analyze the play data to display a piece of advice in next gameplay on how to operate specifically at which timing. Specifically, it discloses an example that the advice is displayed on a game screen to propose slowing down before a corner where the player have previously made a mistake due to excessive speed.

Moreover, Japanese Unexamined Patent Application Publication No. 2019-097870 discloses an example that a "stiff time (stiff period)" characteristic of a fighting game is displayed on a game screen. The "stiff time" is a predetermined length of time set to every action (motion) of a player character, and is a time required before starting a next action after execution of an action. For example, when punching actions are consecutively performed, in order to implement punching, a function required for the "punching" is performed by holding an arm in front of a chest and vigorously stretching it, however, a next punching action cannot be started until the stretched arm is restored. A time "until the stretched aim is restored" corresponds to the stiff time in this example. Accordingly, if a player performs operation input for the next punching action, it is invalid until the stiff time ends. From a viewpoint of an opponent player, the stiff time is a "time to attack", or an "opportunity of a secure attack" that the opponent player can make the attack hit the player without being guarded.

High-level players in a fighting game instantly determine the "opportunity of the secure attack" from a type of action performed by an opponent, and select an appropriate action to effectively attack the opponent. However, players who are not used to the fighting game have difficulty to acquire such an instant determination. Japanese Unexamined Patent Application Publication No. 2019-097870 discloses a technique to display lengths of stiff times and a difference between the stiff times on an attacking side and a defending side on a game screen.

According to Japanese Unexamined Patent Application Publication No. 2019-097870, the players are provided with information on the stiff times. However, the players who are not used to the fighting game do not even know what to do in the stiff times. Specifically, when various types of actions are prepared as in the fighting game, the players do not know how to operate even more. Therefore, conventional advice functions as disclosed in Japanese Unexamined Patent Application Publication No. 2006-141665 and Japanese Unexamined Patent Application Publication No. 2019-097870 are not sufficient. Such a problem exists not only in the fighting game but also in games in different genres if the games include the stiff time set to an action of a player character.

DESCRIPTION OF EXEMPLARY EMBODIMENTS

Figure 1:
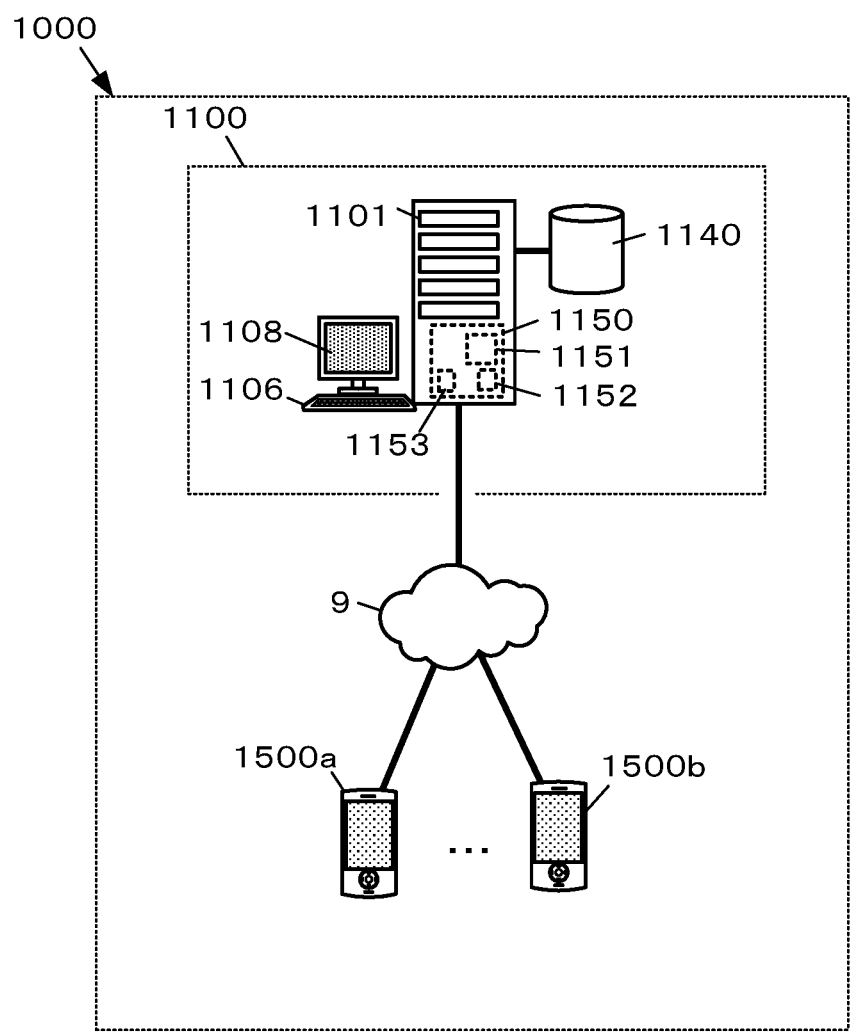
FIG. 1 is a diagram illustrating a configuration example of a game system according to a first embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with a first disclosure, there is provided a computer system comprising:
  at least one processor or circuit programmed to:
  control execution of a match game in which a player character and an opponent character have a match;
  detect occurrence of an action exchange in which one of the player character and the opponent character performs a first action and another one of the player character and the opponent character performs a second action to mutually exchange the actions; and
  control presentation of a recommended candidate action recommended to be performed after an end of an own stiff time to a player controlling the player character, based on the own stiff time related to the action performed by the player character, upon detection of the action exchange.

As a result, in the first disclosure, the computer system can present the recommended candidate action to the player based on the stiff time after the end of the stiff time of the player character upon detection of the action exchange. Thus, appropriate advice can be provided to the player when the action exchange, in which the own player character and the opponent character mutually exchange the actions, occurs and the stiff time occurs.

In accordance with a second disclosure, there is provided the computer system, wherein
  controlling the presentation of the recommended candidate action includes performing the presentation when the own stiff time is shorter than an opponent stiff time related to the action performed by the opponent character.

As a result, in the second disclosure, when a time difference occurs between the stiff times caused to both the player character and the opponent character, and the stiff time of the player character ends earlier, the computer system can present the player with the recommended candidate action that can be performed by the player character by taking advantage of the time difference. The player can learn how to use the time difference from the presentation. Thus, in games including a character set with a stiff time, advice can be provided to the player to take advantage of the time difference between the stiff times.

In accordance with a third disclosure, there is provided the computer system, wherein
  controlling the presentation of the recommended candidate action includes presenting the player with an action that exerts an effect within a time difference between the opponent stiff time and the own stiff time as the recommended candidate action.

As a result, in the third disclosure, the computer system can present the action that exerts the effect within the time difference as the recommended candidate action. Accordingly, when the player character performs the recommended candidate action, the action can surely exert the effect. Thus, a specific action that can be surely performed can be provided to the player.

In accordance with a fourth disclosure, there is provided the computer system, wherein controlling the presentation of the recommended candidate action includes presenting the player with an action that is an attack technique to cause damage and exerts an effect within a time difference between the opponent stiff time and the own stiff time, and that meets a predetermined high effect condition indicating that large damage is caused when the action is performed and hits the opponent, as the recommended candidate action.

As a result, in the fourth disclosure, the computer system can present the action that has a relatively high effect and meets the high effect condition as the recommended candidate action. Thus, it is possible to select and present the action that has a high effect, i.e., the action that is more beneficial to the player, even when many actions are set to the player character. Consequently, quality of an advice function can be enhanced.

In accordance with a fifth disclosure, there is provided the computer system, wherein
  controlling the presentation of the recommended candidate action includes variably selecting an action to be presented as the recommended candidate action based on a character type of the player character.

As a result, in the fifth disclosure, with a configuration in which the player selects the player character from a plurality of types of characters, the computer system can present the recommended candidate action appropriate to a type of character selected as the player character.

In accordance with a sixth disclosure, there is provided the computer system, wherein
  controlling the presentation of the recommended candidate action includes variably selecting an action to be presented as the recommended candidate action based on play history information of the player.

As a result, in the sixth disclosure, the computer system can present the recommended candidate action in accordance with the play history of the player, such as how the player plays the game. The play history information includes information on a play style that the player likes or is good at. Thus, selecting the recommended candidate action based on the play history information allows presentation of the recommended candidate action taking account of the play style that the player likes or is good at. Consequently, user satisfaction with the advice function can be enhanced.

In accordance with a seventh disclosure, there is provided the computer system, wherein
  controlling the presentation of the recommended candidate action includes variably selecting an action to be presented as the recommended candidate action based on play history information of the player and play history information of other players.

As a result, in the seventh disclosure, the computer system can determine the recommended candidate action based on the play history information of the player and other players. The play history information includes information on the play style that the player likes or is good at. Thus, referring to the play history information of a plurality of players allows presentation of a frequently performed popular action as the recommended candidate action. Consequently, user satisfaction with the advice function can be enhanced.

In accordance with an eighth disclosure, there is provided the computer system, wherein
  controlling the presentation of the recommended candidate action includes selecting an action to be presented as the recommended candidate action in accordance with a given selection criterion, and the at least one processor or circuit is further programmed to receive suitability input from the player about the selection criterion after the presentation of the recommended candidate action, and update the selection criterion based on the received suitability input.

As a result, in the eighth disclosure, the computer system can reflect a preference (a result of the suitability input) of the player to the selection of the recommended candidate action. Thus, user satisfaction with the advice function can be enhanced.

In accordance with a ninth disclosure, there is provided the computer system, wherein controlling the presentation of the recommended candidate action includes determining whether to present the recommended candidate action based on play history information of the player.

As a result, in the ninth disclosure, the computer system can omit the presentation of the recommended candidate action when the presentation is not needed based on play results of the player in the past. For example, a player who is skilled in selection and performance of the action taking advantage of the time difference does not want the presentation of the recommended candidate action so much. Thus, the presentation of the recommended candidate action can be omitted to such a player.

In accordance with a tenth disclosure, there is provided the computer system, wherein controlling the presentation of the recommended candidate action includes presenting the player with a recommended input timing to perform the recommended candidate action.

As a result, in the tenth disclosure, the computer system can teach the player the recommended input timing to perform the recommended candidate action. Thus, quality of the advice function can be enhanced.

In accordance with an eleventh disclosure, there is provided the computer system, wherein the at least one processor or circuit is further programmed to perform a progress focus control for temporarily halting or slowing game progress in accordance with the detection of the occurrence of the action exchange.

As a result, in the eleventh disclosure, the computer system shows a motion of the player character by temporarily halting or slowing down than usual, so that the computer system can strongly teach a timing enabling a play taking advantage of the time difference by a visual effect.

In accordance with a twelfth disclosure, there is provided the computer system, wherein controlling the presentation of the recommended candidate action includes presenting a plurality of recommended candidate actions in a selectable manner during the progress focus control, and the at least one processor or circuit is further programmed to cause the player character to perform a recommended candidate action selected by the player from the plurality of recommended candidate actions.

As a result, in the twelfth disclosure, the computer system can cause the player character to perform the action selected by the player from the plurality of recommended candidate actions presented.

In accordance with a thirteenth disclosure, there is provided the computer system, wherein controlling the presentation of the recommended candidate action includes:

presenting a plurality of recommended candidate actions with a series of actions including a plurality of successive actions as a recommended candidate action; and narrowing down the plurality of recommended candidate actions to a series of actions following an action, and updating content of the presentation in accordance with the narrowed-down recommended candidate action to present the narrowed-down recommended candidate action, when the player character performs the action in accordance with operation input by the player after the detection of the occurrence of the action exchange.

As a result, in the thirteenth disclosure, when the player character has performed any action, the computer system can selectively present the series of actions following this action. Since the player is presented with the series of actions following the action that the player has caused the player character to perform, the player can be provided with efficient and developing advice.

In accordance with a fourteenth disclosure, there is provided the computer system, wherein the at least one processor or circuit is further programmed to perform a control for notifying an evaluation result to the player by evaluating an action performed by the player character after the end of the own stiff time, when the detection of the occurrence of the action exchange is performed and the own stiff time is shorter than the opponent stiff time.

As a result, in the fourteenth disclosure, the computer system can notify the evaluation result of the action performed by the player character after the end of the own stiff time. Thus, the player can have a criterion for determining suitability of his/her own operation.

In accordance with a fifteenth disclosure, there is provided the computer system, wherein the control for notifying the evaluation result includes evaluating an operation input timing related to the action of the player character after the end of the own stiff time.

As a result, in the fifteenth disclosure, the computer system can notify the evaluation of the operation input timing related to the action of the player character.

In accordance with a sixteenth disclosure, there is provided the computer system, wherein controlling the presentation of the recommended candidate action includes presenting the recommended candidate action during a replay of the match game.

The replay is a suitable opportunity for reconfirming content of the gameplay so as to make it as information for reflections. As a result, in the sixteenth disclosure, the computer system presents the recommended candidate action during the replay, so that the computer system can give the advice at an appropriate opportunity.

In accordance with a seventeenth disclosure, there is provided the computer system, wherein controlling the presentation of the recommended candidate action includes setting a timing to present the recommended candidate action during the replay based on a game progress result of the match game.

The "game progress result" as used herein includes damage caused to the opponent by taking advantage of the time difference between the stiff times, for example. As a result, in the seventeenth disclosure, the computer system can select and set the timing to present the recommended candidate action based on such a game progress result. Thus, even when there are a large number of detection results of the action exchange, the computer system can set the timing of the presentation by limiting to a situation largely affecting victory or defeat, so that the computer system can appropriately control a presentation frequency.

In accordance with an eighteenth disclosure, there is provided a game system comprising:
  a server system that is the computer system as defined in claim 1, the server system being configured to communicate with a player terminal to control execution of the match game; and
  the player terminal.

As a result, in the eighteenth disclosure, the game system that can exert the above-described advantageous effects can be implemented.

Hereinafter, examples of embodiments of the present disclosure will be described. Note that modes to which the present disclosure is applicable are not limited to the following embodiments.

First Embodiment

FIG. 1 is a diagram illustrating a configuration example of a game system according to a first embodiment. A game system 1000 according to the present embodiment is a computer system that includes a server system 1100 and a plurality of player terminals 1500 (1500a, 1500b, . . . ) that are capable of mutual data communication by connection to a network 9 and is a content providing system that provides game contents (also called as game applications).

The network 9 is a communication channel capable of data communication. Specifically, the network 9 includes a communication network such as a local area network (LAN) using a private line (a private cable) for direct connection or Ethernet (registered trademark), a telecommunication network, a cable network, and an Internet. A communication method may be a cable communication method or a wireless communication method.

The server system 1100 includes a main body device 1101, a keyboard 1106, a touch panel 1108, and a storage 1140. The main body device 1101 has a control board 1150.

The control board 1150 includes a microprocessor of various types such as a central processing unit (CPU) 1151, a graphics processing unit (GPU), or a digital signal processor (DSP), an integrated circuit (IC) memory 1152 of various types such as a video random-access memory (VRAM), a random-access memory (RAM), or a read-only memory (ROM), and a communication device 1153. The control board 1150 may be implemented partially or entirely by an application specific integrated circuit (ASIC), a field-programmable gate array (FPGA), or a system on a chip (SoC).

Through a calculation process performed by the control board 1150 based on a predetermined program and data, the server system 1100 implements a user management function related to user registration and a game management function of providing data required for gameplay with the player terminals 1500 (1500a, 1500b, . . . ) by the registered users serving as players to manage an execution control on the game played with the player terminals 1500 (1500a, 1500b, . . . ). That is, the game in accordance with the present embodiment is implemented as a kind of client-server online game.

The server system 1100 is illustrated/described as a single server. Alternatively, a plurality of blade servers, in charge of various functions, may be installed and connected to each other via an internal bus to perform data communication. The server system 1100 may also be configured such that a plurality of independent server devices installed at separate places perform data communication via the network 9 to function as the server system 1100 as a whole. For example, when a data accumulation server for accumulating information related to gameplay of an unspecified large number of players is separately prepared, a storage section of the data accumulation server can be regarded as the storage 1140.

The player terminals 1500 (1500a, 1500b, . . . ) are computer systems individually usable by the registered users serving as players for gameplay, and are electronic devices (electronic apparatus) that can access the server system 1100 via the network 9 to implement an online game. Each of the player terminals functionally constitutes a game device and a game controller. The player terminal 1500 according to the present embodiment is described as a device called as a smartphone as hardware. The player terminal 1500 may also be a portable game device, a game controller, a personal computer, a tablet computer, a wearable computer, a consumer game device, an arcade game apparatus, or the like.

Figure 2:
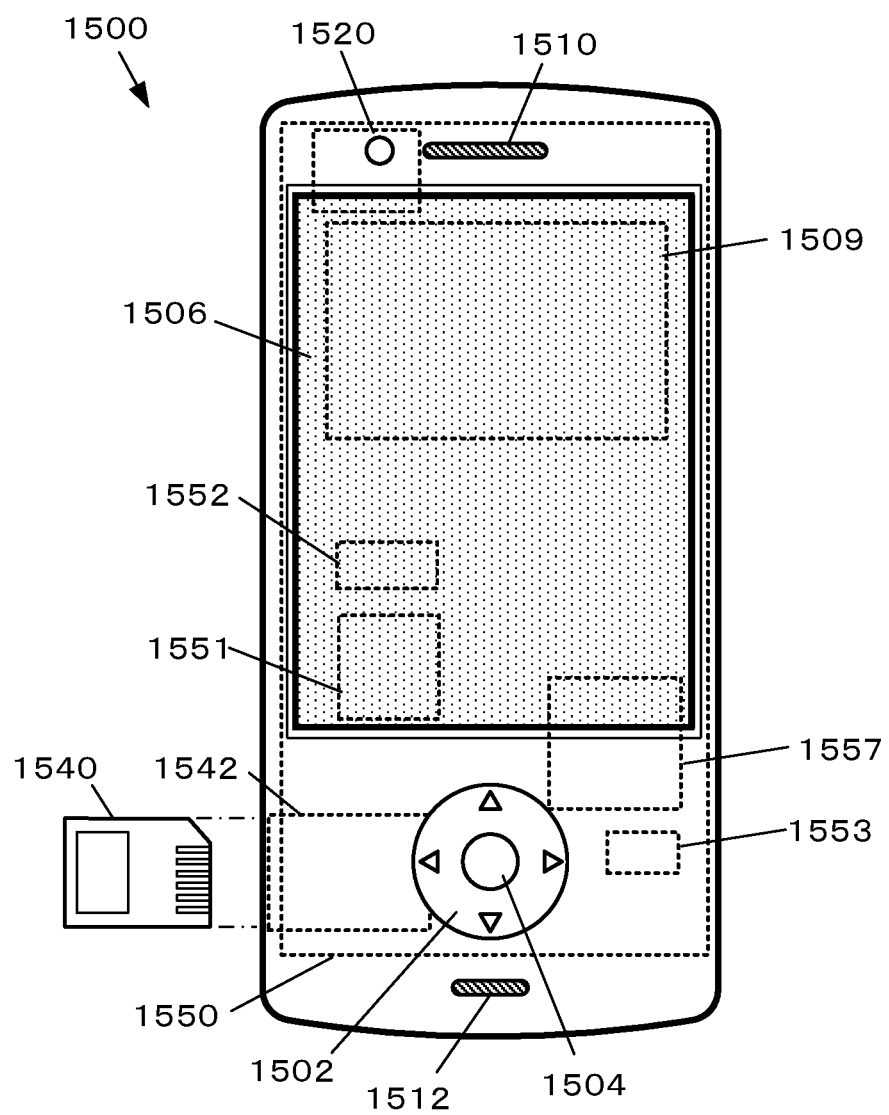
FIG. 2 is a front view of a configuration example of a player terminal.

FIG. 2 is a front view of a configuration example of the player terminal 1500 according to the present embodiment.

The player terminal 1500 includes an arrow key 1502, a button switch 1504, a touch panel 1506 functioning as an image display device and a touch position input device, a speaker 1510, a built-in battery 1509, a microphone 1512, a camera 1520, a control board 1550, and a memory card reader 1542 capable of writing and reading data on and from a memory card 1540 that is a computer readable storage medium. The player terminal 1500 further includes a power button, a volume control button, or the like (not illustrated). Furthermore, the player terminal 1500 may include an IC card reader that can implement contactless writing and reading of data to and from an IC card as a credit card or a prepaid card usable for payment of costs for playing the game.

The control board 1550 includes a microprocessor of various types such as a CPU 1551, a GPU, and a DSP, an IC memory 1552 of various types such as a VRAM, a RAM, and a ROM, a wireless communication module 1553 for performing wireless communications with a mobile phone base station, a wireless LAN base station, or the like connected to the network 9, an interface circuit 1557, and the like.

The interface circuit 1557 includes, for example, a driver circuit for the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, a circuit that inputs image data of an image captured by the camera 1520, and a signal input-output circuit that inputs and outputs a signal to and from the memory card reader 1542.

These elements mounted on the control board 1550 are electrically connected with each other via a bus circuit or the like to exchange data and signals. The control board 1550 may be partially or entirely implemented by an ASIC, an FPGA, or an SoC. The control board 1550 stores programs and various types of data in the IC memory 1552 for implementing functions of the player terminal of the game according to the present embodiment.

The player terminal 1500 is configured to download client programs and various types of setting data from the server system 1100 in the present embodiment. Alternatively, the player terminal 1500 may be configured to read the programs and the data from a storage medium such as the memory card 1540 additionally provided.

Figure 3:
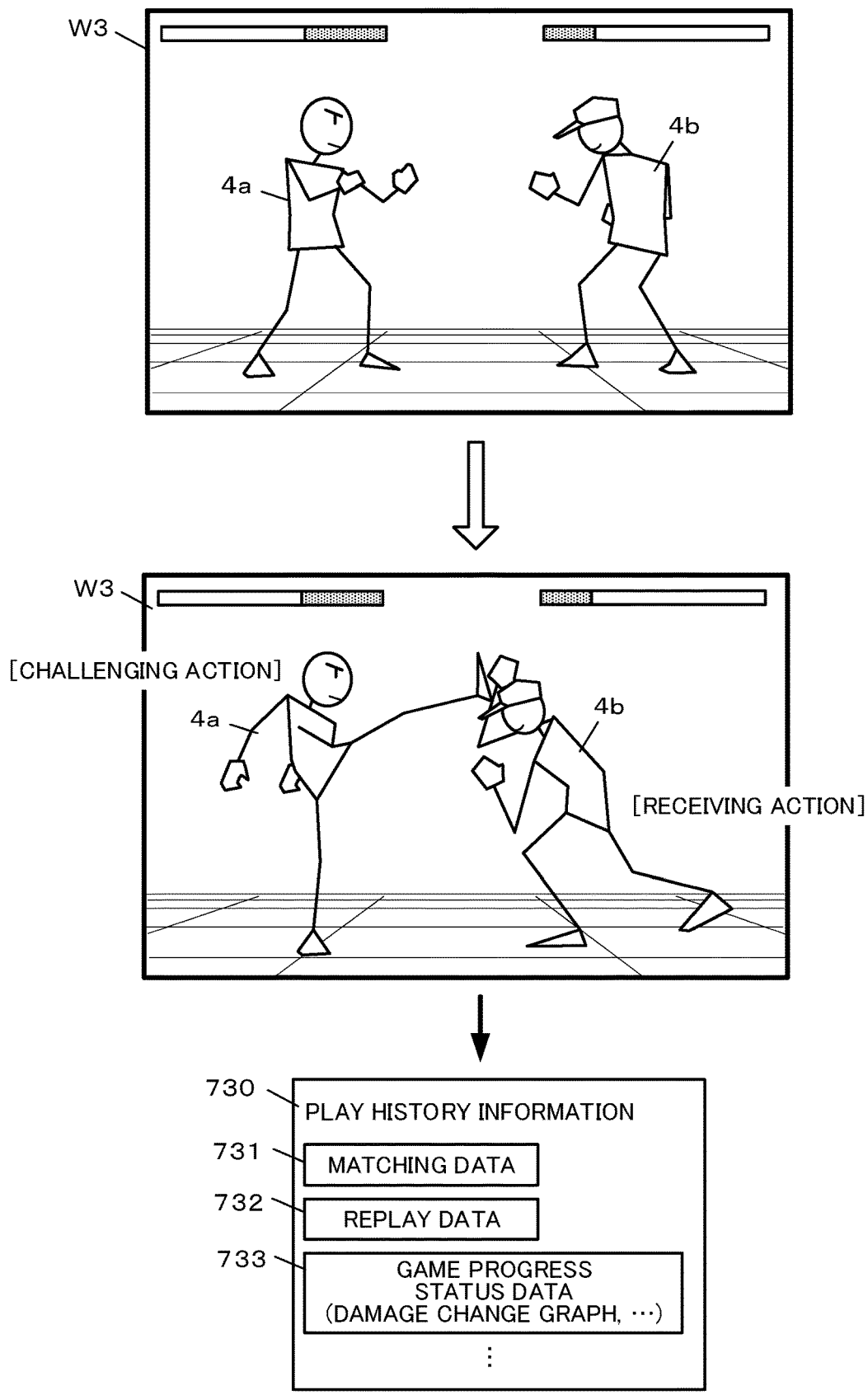
FIG. 3 is a diagram illustrating a display example of a game screen.

FIG. 3 is a diagram illustrating a display example of a game screen.

The game according to the present embodiment is a match-type fighting game. Each player selects a character to use as a player character 4 (4a, 4b, . . . ) from a plurality of types of candidate characters to play. Each of the plurality of types of candidate characters selectable as the player character 4 is set in advance with a plurality of types of "challenging actions" and a plurality of types of "receiving actions".

Each of the plurality of types of "challenging actions" is an action used to start a motion against an opponent character. In the fighting game, this corresponds to an attack technique.

Each of the plurality of types of "receiving actions" is an action used to respond to an action started by an opponent character, and further includes a "positive receiving action" and a "passive receiving action". The "positive receiving action" is an action positively responding to the challenging action by the opponent character. In the fighting game, this corresponds to a defending technique (a guarding technique), an avoiding motion such as stepping back or jumping, a counter technique that can conversely attack the opponent when it is timely performed in accordance with a motion of the opponent. The "passive receiving action" is an action consequently performed when no operation input is made to cause the positive receiving action. In the fighting game, this corresponds to a "struck" action performed when the attack is received with no guard.

The players repeatedly perform predetermined operation input for each of the challenging action or the receiving action that the players cause their player characters 4 to perform to play the game. That is, if it is described by focusing on one of the players, the game according to the present embodiment is a game proceeding with an action exchange in which one of the player character and the opponent character performs a first action and another one of the player character and the opponent character performs a second action to mutually exchange the actions.

Content of the gameplay is recorded and stored as play history information 730 associated with each play. The play history information 730 includes matching data 731, replay data 732, and game progress status data 733, for example. Other types of data can be included as appropriate.

The matching data 731 includes information such as a player account, age, or a player level (a skill index automatically set according to a play performance) of each player participating in the gameplay.

The replay data 732 is data prepared for replaying the play after the play, and stores content, an input timing, and a result of a motion of the player character 4 caused by operation input at each operation input by each player, in association with a time series, for example.

The game progress status data 733 describes status and changes of the game progress. The game progress status data 733 includes data of a damage transition of each player character (i.e., a play performance of each player) in the fighting game.

Figure 4:
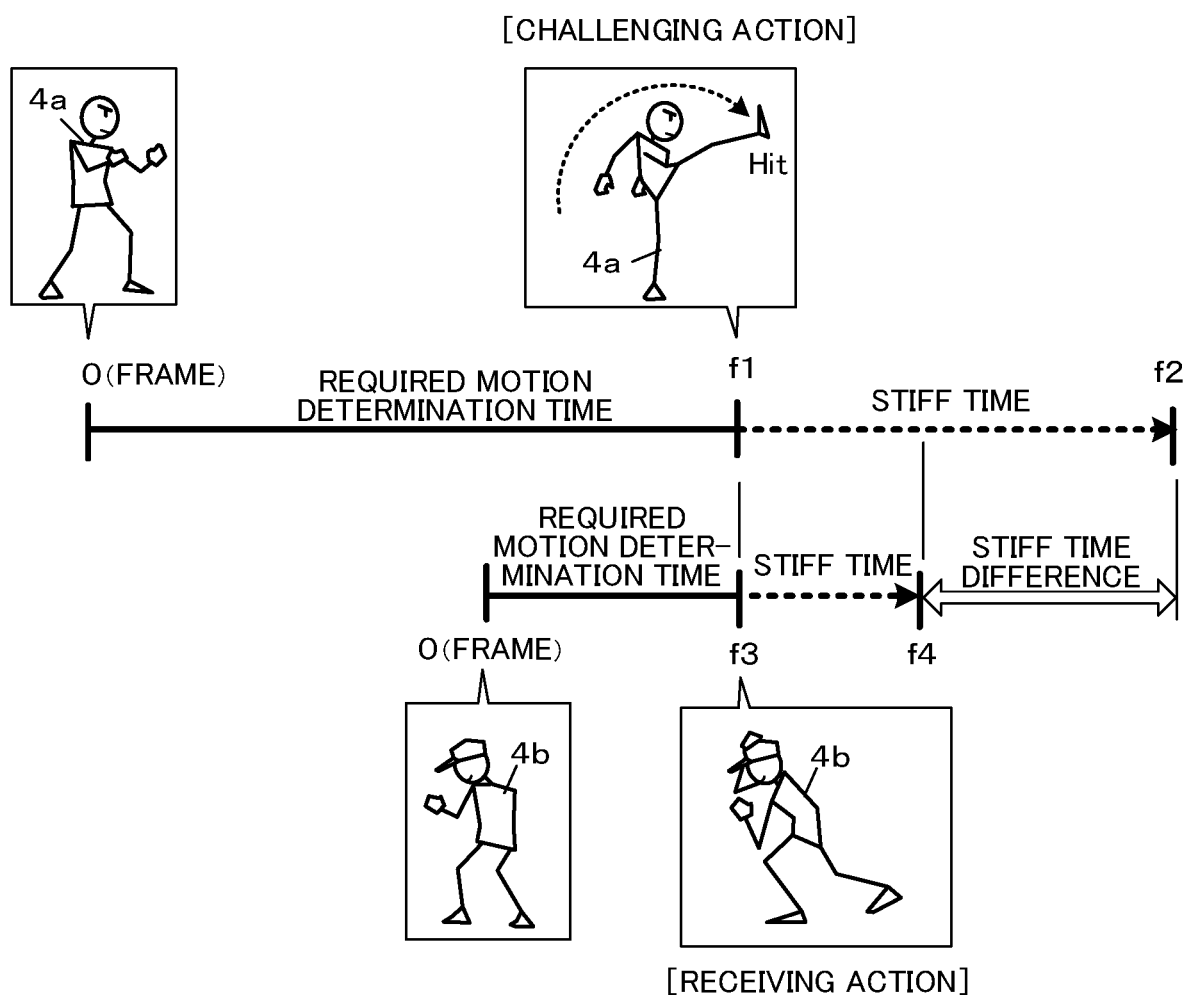
FIG. 4 is a diagram illustrating an action exchange and a stiff time difference.

FIG. 4 is a diagram illustrating the action exchange and a stiff time difference. An upper horizontal line in FIG. 4 represents a time line of an action control of a first player character 4a. A lower horizontal line in FIG. 4 represents a time line of an action control of a second player character 4b.

Note that a rendering frame of a game screen is used as a unit for describing a length of time related to an action in the following description.

An example in FIG. 4 shows that a first action by the first player character 4a is the "challenging action" and a second action by the second player character 4b is the "receiving action".

Each type of "challenging action" is set with a "required motion determination time" (from a zeroth frame to a first frame f1 in FIG. 4) that is a required time from a start of a motion until a hit determination is made, and a "stiff time" (from the first frame f1 to a second frame f2 in FIG. 4) after the hit determination.

The required motion determination time of the challenging action is a length of time required until it is considered that an effect of the action is exerted or an effect is validated. When the challenging action is an attack technique, the required motion determination time is a length of time from the start of the action until the hit determination of the attack is made. Thus, the required motion determination time is set with a predetermined fixed value in accordance with content (a way of showing) of a motion of the character in the action.

The stiff time of the challenging action includes several types set in accordance with situations. Specifically, a different stiff time is set for each situation, such as when the effect of the action does not work on the opponent (e.g., when the action misses), when a response by the opponent character is valid (e.g., when the action is blocked), when the opponent character does not respond or responds too late (e.g., when the action hits the opponent character with no guard, or it is determined that the guard is too late), or when the action crosses a challenging action by the opponent character. The stiff time can be set for other situations. On the contrary, the stiff time may be a fixed value fixed for each type of action.

The challenging action includes a plurality of types. The required motion determination time and the stiff time tend to be shorter as the action is smaller and quicker and has a relatively smaller effect. On the contrary, the required motion determination time and the stiff time tend to be longer as the action has a relatively larger effect, which is what we call a powerful technique. The present embodiment is described under a presumption that the stiff time of the challenging action is fixed for each type.

Each type of "receiving action" is similarly set with the "required motion determination time" (from the zeroth frame to a third frame f3 in FIG. 4) and the "stiff time" (from the third frame f3 to a fourth frame f4 in FIG. 4).

The stiff time of the receiving action is set for each different situation, such as a type of received challenging action, whether a hit determination and a defense establishment determination are made before a motion is completed, or whether the hit determination and the defense establishment determination are made after the motion is completed. The stiff time can be set for other situations. On the contrary, the stiff time may be a fixed value fixed for each type of action. The present embodiment is described under a presumption that the stiff time of the receiving action is variously set according to the situations.

The example in FIG. 4 shows a stiff time difference related to the action exchange of a combination of the challenging action and the receiving action. However, the stiff time difference is not limited to this combination, and the stiff time difference also occurs when the player characters 4 (4a, 4b, . . . ) on both sides perform the challenging actions to cause the action exchange.

The server system 1100 detects the "action exchange" when one of the player characters starts performing a receiving action (or a challenging action) while another one of the player characters is performing a challenging action.

A timing to detect the action exchange is set to a timing when a preceding challenging action in the action exchange is started, or may be set to a timing when a stiff time of the challenging action starts.

When the server system 1100 detects the action exchange, the server system 1100 obtains a time difference, i.e., a "stiff time difference", between an end timing of a stiff time of a preceding challenging action (a first action) and an end timing of a stiff time of a following receiving or challenging action (a second action). In the example in FIG. 4, the "stiff time difference" is a time difference between the second frame f2 and the fourth frame f4. Although the first frame f1 and the third frame f3 are illustrated to coincide to facilitate understanding, these frames do not necessarily coincide in practice.

Then, the server system 1100 focuses on each player character 4, and compares the end timing of the stiff time (an own stiff time) of a focused player character 4 and the end timing of the stiff time (an opponent stiff time) of a player character 4 (an opponent player character) of an opponent.

When the focused player character 4 is set with a challenging action whose own stiff time ends earlier than the opponent stiff time and whose required motion determination time is shorter than the stiff time difference, the server system 1100 detects this as a timing that allows giving advice to the player using the player character, i.e., as an "advice timing".

In the example in FIG. 4, the stiff time of the first player character 4*a* ends earlier than the stiff time of the second player character 4*b*. When the second player character 4*b* is set with the challenging action whose required motion determination time is shorter than the stiff time difference, the server system 1100 detects the "advice timing" with the player using the second player character 4*b* as an "advice target player". Specifically, a start frame of the preceding challenging action that is an origin of the detected action exchange is set as an advice timing frame. Then, the server system 1100 performs an advice display for the advice target player at each advice timing.

Next, the advice display is described.

Figure 5:
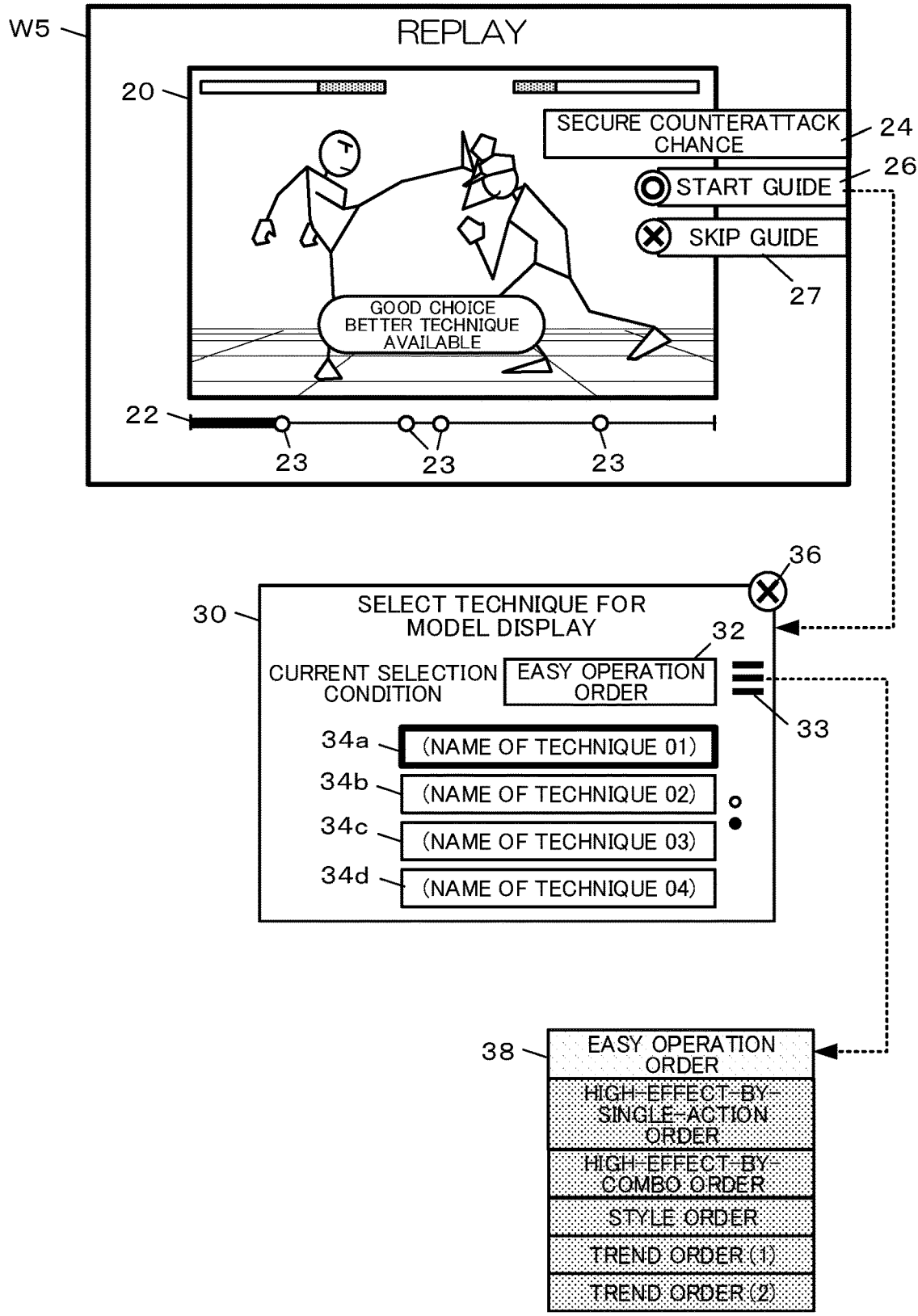
FIG. 5 is a diagram illustrating a display example when an advice timing arrives during a replay.

FIG. 5 is a diagram of a display example when the advice timing arrives during the replay.

In the present embodiment, the advice display for the advice target player is performed during the replay. The "replay" as used herein means an automatic reproduction of gameplay after an end of the gameplay based on the replay data 732 (see FIG. 3) in the play history information 730 automatically recorded during the gameplay.

Once the gameplay ends, the server system 1100 automatically starts a display control of the replay of the gameplay, i.e., starts the replay, and causes the player terminal 1500 to display a replay screen W5.

The replay screen W5 includes a replay video image 20 and a seek bar 22. The seek bar 22 functions as a display section that indicates which timing in a time related to the gameplay a displayed part in the video image correspond to, and an operation reception section that receives a specifying operation of a timing to be displayed as the replay video image 20. The seek bar 22 includes a timing mark 23 displayed for each "advice timing" with a player watching the replay video image 20 as the advice target player.

When the advice timing arrives during the replay, the server system 1100 slows display progress of the replay compared with display progress of a normal replay. That is, the server system 1100 starts a slow-motion replay and continues it until an end of the stiff time difference. Then, the server system 1100 temporarily halts the display progress of the replay at the end of the stiff time difference. With such a control of halting or slowing the display progress of the replay, the progress of the replay is focused. Accordingly, it is possible to give the player a strong impression that a present moment is a target of the advice and is an important time period.

Then, the server system 1100 displays a chance timing display 24 for notifying that a motion taking advantage of the stiff time difference is possible, a start operation icon 26 for starting an advice display, and a skip operation icon 27 for skipping the advice display.

In response to operation of the start operation icon 26, the server system 1100 performs a pop-up display of a recommended candidate action presentation section 30. The recommended candidate action presentation section 30 includes an applied selection condition display section 32, an action selection operation icon 34 (34*a*, 34*b*, . . . ) prepared for each recommended candidate action, and a skip operation icon 36 for skipping the advice display.

The applied selection condition display section 32 shows a type of "selection condition" that is currently applied for selecting and sorting recommended candidate actions. The "selection condition" as used herein relates to a process of presenting the player with the advice on the recommended candidate action recommended as a motion taking advantage of the stiff time difference, and includes a condition for selecting an action as the recommended candidate action from challenging actions and a sort condition indicating a selection order or a presentation order.

For example, types of selection conditions include followings.

(1) "Easy operation order" for presenting actions by selecting and sorting the actions in order of easy operation input (2) "High-effect-by-single-action order" for presenting actions by selecting and sorting the actions in descending order of an attack effect by a single action (a high effect condition: descending order of a damage value given to an opponent, descending order of a number of attack times given to an opponent, descending order of a length of restriction time by stiffness caused on an opponent, or the like)

(3) "High-effect-by-combo order" for presenting combo patterns by extracting combo patterns including a first action that can exert an effect within a stiff time difference from a predetermined combo patterns including a combination of a plurality of actions, and sorting the combo patterns in descending order of an attack effect (4) "Style order" for sorting actions by giving a priority to a play style of a player (5) "Trend order" for presenting actions by selecting recommended candidate actions based on popularity from actions that have been selected in similar situations, and sorting the actions in descending order of the popularity. The actions that have been selected in the similar situations can be obtained as a result of statistical processing of many pieces of replay data (part of the play history information) of other players.

Other types of display can be set as appropriate.

The action is set such that operation input for a smaller technique that can be performed in a shorter time is easier and an action time and a stiff time of the smaller technique are shorter. Thus, the "easy operation order" may also be said as "speed order".

The player style of the player can be obtained from the replay data 732 in the play history information 730 (or a copy thereof) by statistically processing a number of execution times of each type of action (e.g., punching, kicking, or throwing). In the "style order", the types of actions are sorted such that the types having a larger number of execution times are highly ranked on a priority basis.

As for the "trend order", a plurality of types can be further set by setting a narrowing condition for regarding as the "similar situations". For example, it is possible to set a type simply including a narrowing condition only on a length of the stiff time difference, a type further including an additional narrowing condition that a player level indicating skill of a player is close, or a type further including an additional narrowing condition that an opponent character and a challenging action are identical.

As for the "combo order", when a player character has performed any action in the stiff time difference, narrowing is performed in relation to a series of successive actions, so-called "combo", with this action as a start point. Specifically, in the gameplay, when the player character of the advice target player has performed a technique A1 in the stiff time difference, and a combo A is constituted by successively performing a technique A2, a technique A3, and so on after the technique A1, this combo is selected as the recommended candidate action and is presented on a priority basis. When there are a combo B and a combo C both including the technique A1 as a first technique, these combos are also selected as the recommended candidate actions and are presented on a priority basis. When the player character has successively performed the technique A1 and the technique A2 in the stiff time difference, the combo A is presented as the recommended candidate action as a result of narrowing. When the combo B also includes the same second technique, the combo B remains as a result of narrowing, and thus is presented as the recommended candidate action. When the combo C includes a different second technique, the combo C is excluded by narrowing, and thus is not selected nor presented as the recommended candidate action.

The applied selection condition display section 32 includes a selection condition change operation section 33. In response to operation of this operation section, the server system 1100 additionally displays a selection condition selection section 38. The selection condition selection section 38 performs a list display of selection conditions for each type, and an identification display of a selection condition currently selected.

The server system 1100 changes the selection condition to be applied according to a predetermined change operation (e.g., input in an upward or a downward direction) performed while the selection condition selection section 38 is displayed. When the selection condition to be applied is changed, the server system 1100 reselects the recommended candidate action, and changes the displays of the applied selection condition display section 32 and the action selection operation icon 34 (34a, 34b, . . . ) in the recommended candidate action presentation section 30.

The player selects any one of action selection operation icons 34 (34a, 34b, . . . ) when recommended candidate actions currently presented in the recommended candidate action presentation section 30 are appropriate for the player, in other words, when the selection condition for selecting the recommended candidate actions is appropriate. In that sense, the action selection operation icon 34 (34a, 34b, . . . ) functions as a section that receives evaluation input indicating that a currently applied selection criterion is appropriate from the player.

On the other hand, when the player thinks that the recommended candidate actions currently presented are not appropriate for the player, the player operates the selection condition change operation section 33 to change the selection condition to a desired selection condition. In that sense, the selection condition change operation section 33 and the selection condition selection section 38 function as sections that receives evaluation input indicating that a currently applied selection criterion is not appropriate from the player.

Now, when any one of the action selection operation icons 34 is selected by a selection operation, the server system 1100 regards that the presentation of the recommended candidate actions is approved, and performs a model display of the recommended candidate action corresponding to the selected icon.

Figure 6:
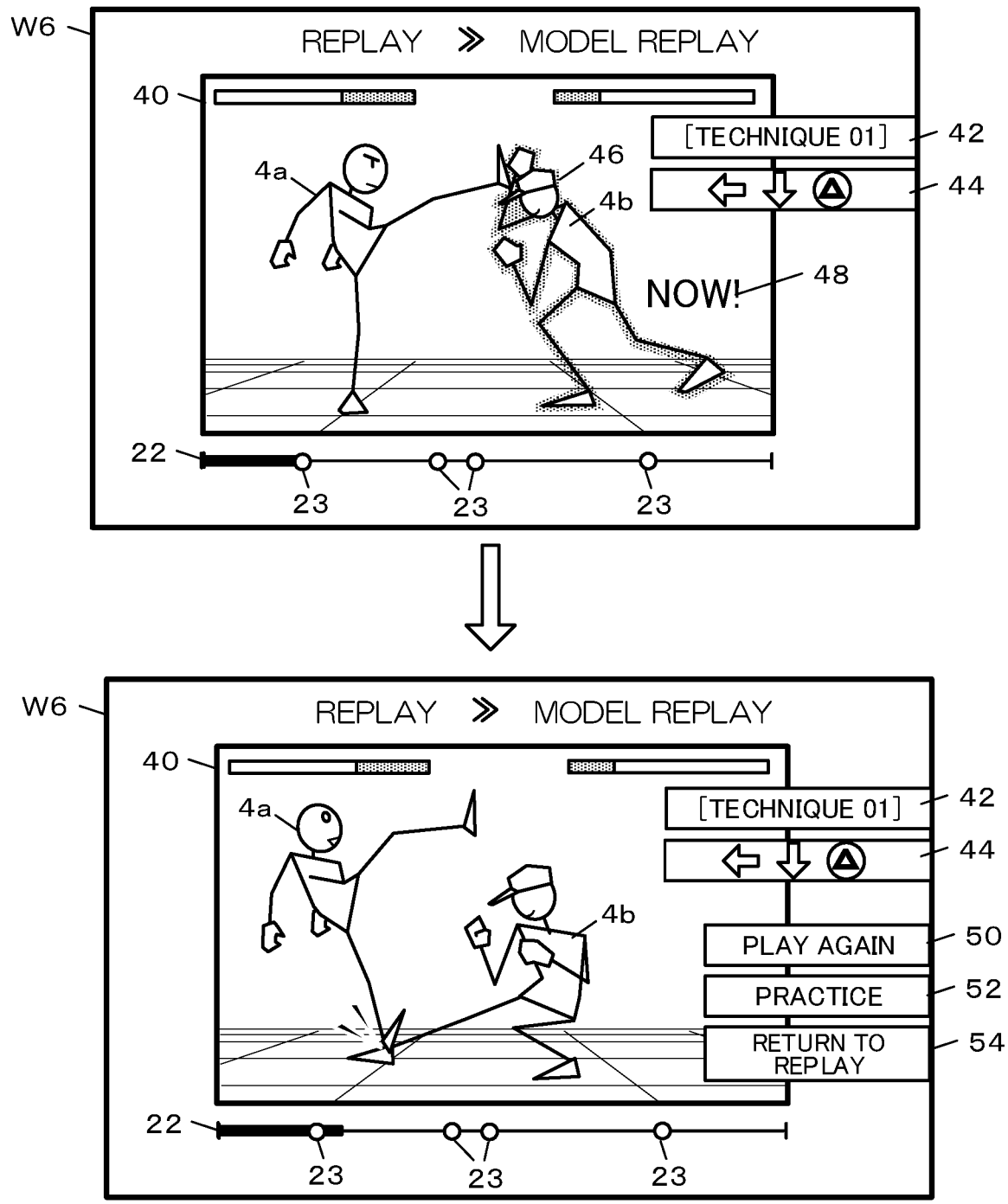
FIG. 6 is a diagram illustrating a display example of a model display.

FIG. 6 is a diagram illustrating a display example of the model display.

A replay screen W6 during the model display includes a model video image 40, a model target action name 42, and an operation input pattern display 44 for executing a model target action.

The model video image 40 is a video image that reproduces the gameplay from a start of the challenging action by the player character 4a on a challenging side based on the replay data. A control of the player character is different from a control in a normal replay after the advice timing.

The server system 1100 generates a video image by applying the recommended candidate action corresponding to the selected action selection operation icon 34 to the player character 4b of the advice target player to cause the player character to perform the action, instead of the replay data. That is, the model video image 40 teaches "how it works if the player correctly inputs the selected recommended candidate action".

Speed of the display progress of the model video image 40 may be similar to speed of the normal replay, or may be slower than the speed of the normal replay.

Furthermore, when the model video image 40 is displayed, the server system 1100 displays a first timing display 46 and a second timing display 48 that clearly indicate a recommended input timing to perform operation input for the recommended candidate action presented as the model.

The first timing display 46 is implemented by applying a special display mode to the player character of the advice target player. The example in FIG. 6 shows the player character 4b, on a receiving side on the right in the screen, whose outline is highlighted by a special display color. The second timing display 48 is implemented by a text display.

The recommended input timing is within a period from shortly before the end of the stiff time of the player character of the advice target player (by a time taking account of a time lag from a recognition of content of the game screen by the player to a start of an operation input motion) and for a predetermined frame from a start of the stiff time difference. In the example in FIG. 4, the recommended input timing is indicated as a period from shortly before the fourth frame f4, or before or after the start of the stiff time difference and for the predetermined frame.

The model display is completed when the selected recommended candidate action is completed. The server system 1100 temporarily halts the display progress of the model video image 40, and additionally displays a repeat display operation icon 50 for operation input to display the same model video image 40 again from the start, a practice transition operation icon 52 for operation input to start practicing the action presented as the model, and a replay return operation icon 54 to return to the replay.

Figure 7:
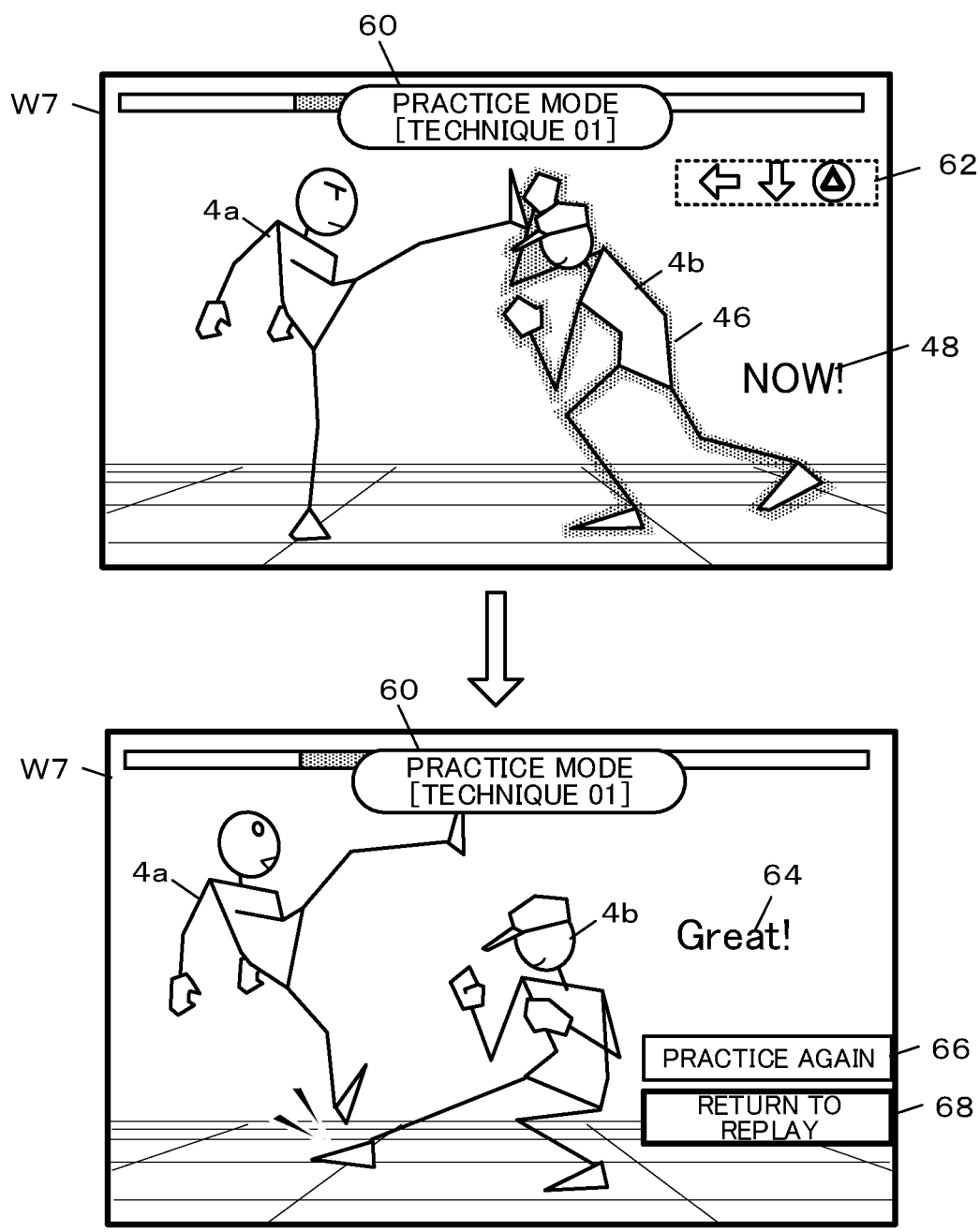
FIG. 7 is a diagram illustrating a screen display example (1) in a practice mode.

FIG. 7 is a diagram illustrating a screen display example in a practice mode.

The practice mode is a control mode for allowing the player to practice the operation input for the recommended candidate action displayed as the model.

The server system 1100 allows the operation input for the player character of the advice target player (the player character 4b on the receiving side on the right in the screen in the example in FIG. 7), and sets and automatically controls the opponent character (the player character 4a on the challenging side on the left in the screen in the example in FIG. 7) to cause the opponent character to perform the motion (the challenging action that is the origin of the detection of the current advice timing in the example in FIG. 7) in the replay. In order to perform this control, another virtual three-dimensional space may be separately prepared for the control of the practice mode, apart from a virtual three-dimensional space for the replay display.

A practice mode screen W7 includes a screen layout similar to a screen layout of the game screen during the play. Speed of the display progress in the practice mode is also the same as that in the normal gameplay. However, the practice mode screen W7 includes a mode indication 60 clearly indicating that this is the practice mode and an operation input pattern 62 of the recommended candidate action previously presented in the model display. The practice mode screen W7 also includes the first timing display 46 and the second timing display 48, similarly to the model display.

When the advice target player performs the operation input for the recommended candidate action presented as the model display, the server system 1100 evaluates an input timing and displays an evaluation result 64. When execution of the recommended candidate action is completed, the server system 1100 displays a repeat practice operation icon 66 for receiving an operation to perform the practice again, and a replay return operation icon 68 for receiving an operation to terminate the practice mode and return to the replay display.

Upon detection of the operation of the replay return operation icon 68, the server system 1100 regards that the advice display related to the current advice timing is terminated, and restarts the display control of the replay screen W5. Then, when a next advice timing arrives, the server system 1100 performs a progress focus control of changing the speed of the display progress, a model display control, and a practice mode control in the same manner.

Figure 8:
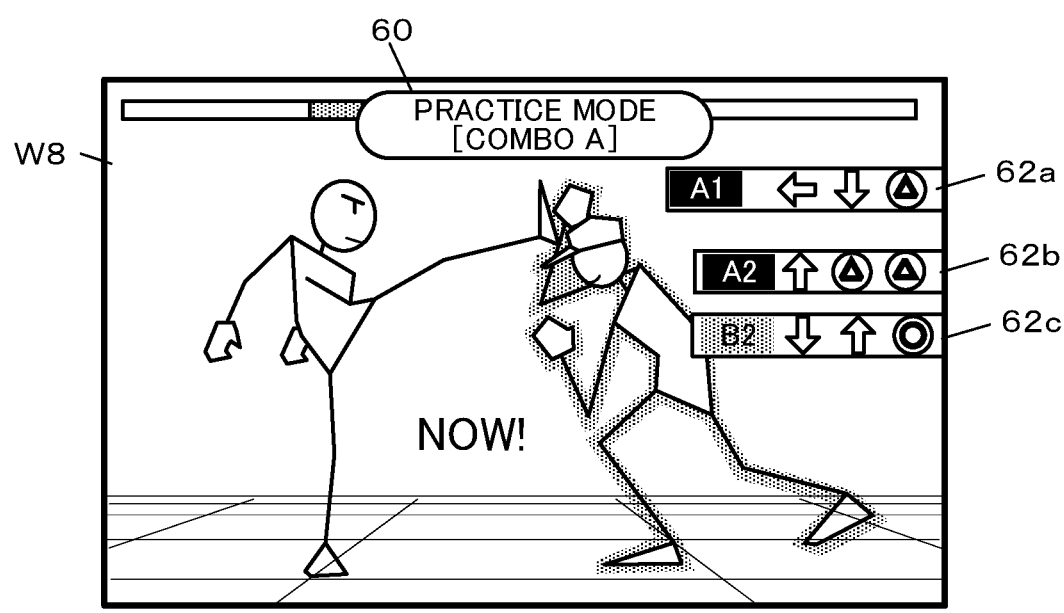
FIG. 8 is a diagram illustrating a screen display example (2) in the practice mode.

When the recommended candidate action performed in the practice mode is a combo (a series of successively performed actions), as illustrated in the example of a practice mode screen W8 in FIG. 8, the operation input pattern 62 may be displayed by narrowing down other actions to another recommended candidate action that can constitute a combo by following an action performed in accordance with the operation input by the player.

For example, in the example in FIG. 8, the action displayed in the model display as the recommended candidate action selected by the player is a combo A, and the example shows a state that a first technique A1 of the combo A has been performed. The combo A is a successive technique including a technique A2 following the technique A1. Thus, a first operation input pattern 62a corresponding to the technique A1 is displayed.

At this time, since the second challenging action included in the combo A is the technique A2, the server system 1100 additionally displays a second operation input pattern 62b related to this technique as an advance notice. In addition, when there is a combo B including the same first technique as that of the combo A, the server system 1100 narrows down techniques to a technique B2 of a second challenging action included in the combo B to additionally display as a third operation input pattern 62c. The combo B is a successive technique including the technique B2 following the technique A1.

When the player inputs the second operation input pattern 62b related to the technique A2 as the second challenging action, the server system 1100 deletes the third operation input pattern 62c related to the technique B2, and displays an operation input pattern 62 of a technique A3 of a third challenging action included in the combo A. When there is another combo including the technique A2, the server system 1100 additionally displays an operation input pattern 62 of a technique of a third challenging action in the other combo.

This is repeated until the combo ends.

Such narrowing and a display can be performed when it is presumed that the player attempts to achieve a combo starting from execution of the recommended candidate action taking advantage of the stiff time. As a result, it is possible to present options to the player, such as what kind of combo can be constituted based on the status of the operation input.

Next, a functional configuration of the game system 1000 is described.

Figure 9:
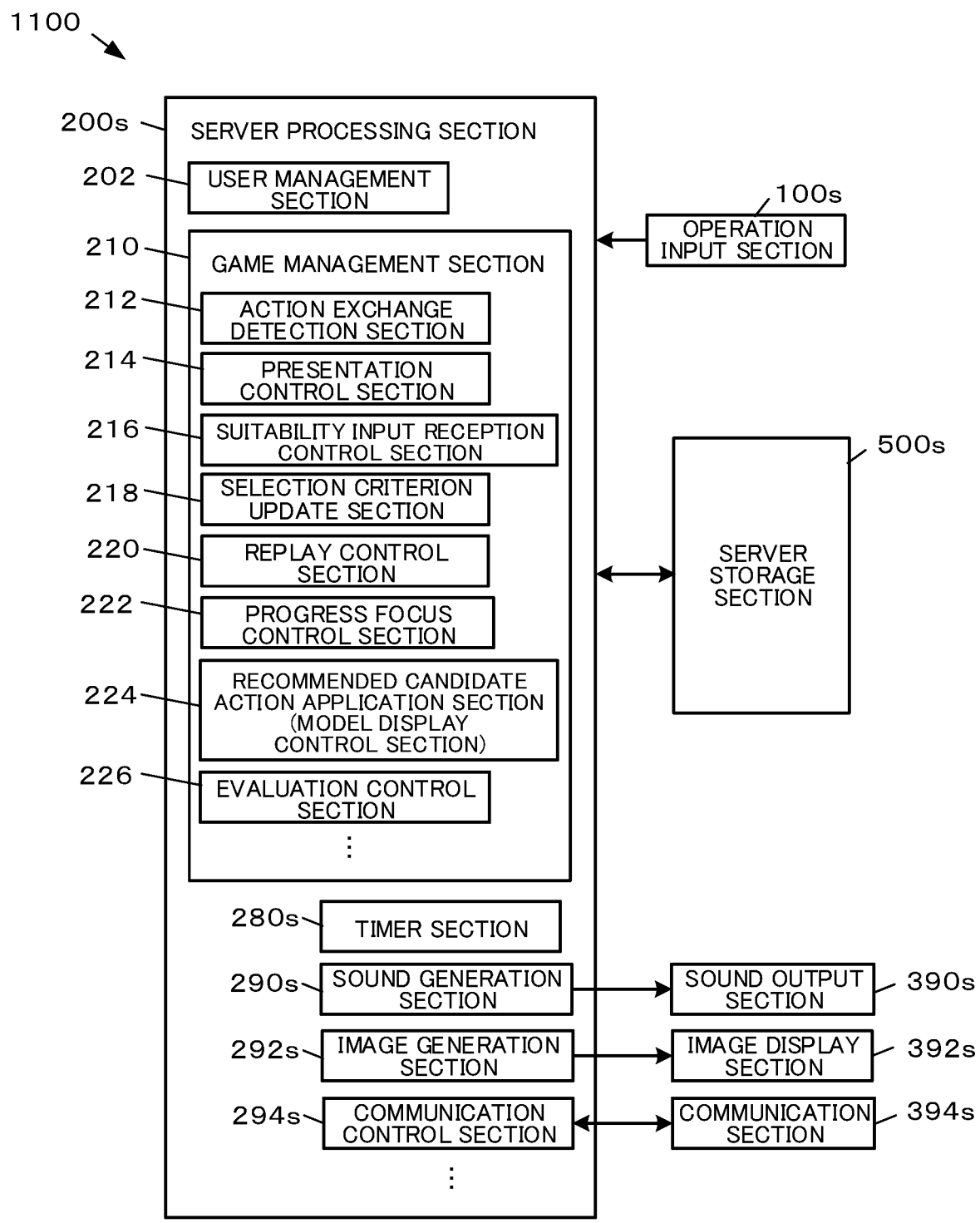
FIG. 9 is a functional block diagram illustrating a functional configuration example of a server system according to the first embodiment.

FIG. 9 is a functional block diagram illustrating a functional configuration example of the server system 1100. The server system 1100 includes an operation input section 100s, a server processing section 200s, a sound output section 390s, an image display section 392s, a communication section 394s, and a server storage section 500s.

The operation input section 100s is a means for inputting various operations for server management. The operation input section 100s corresponds to the keyboard 1106 in FIG. 1.

The server processing section 200s is implemented with electronic components such as a microprocessor, e.g., a CPU and a GPU, an ASIC, and an IC memory. The server processing section 200s controls data exchanged between functional sections including the operation input section 100s and the server storage section 500s. The server processing section 200s performs various calculation processes based on predetermined programs and data, operation input signals from the operation input section 100s, data received from the player terminal 1500, or the like to comprehensively control the operations of the server system 1100.

The server processing section 200s according to the present embodiment includes a user management section 202, a game management section 210, a timer section 280s, a sound generation section 290s, an image generation section 292s, and a communication control section 294s. Other functional sections may be included as appropriate.

The user management section 202 performs a process related to a user registration procedure and manages the data of each user associated with a user account. In the present embodiment, the user management section 202 performs: (1) issuing a unique user account to a registered user; (2) registration information management for registering and managing personal information for each user account; (3) play history management for accumulating and managing play history information; (4) management of owned items; (5) management of play histories of unspecified large number of users; or the like. Other management functions for other data associated with the account can be included as appropriate.

The game management section 210 performs various processes related to game execution management. The game according to the present embodiment is a client-server online game, and thus the game management section 210 according to the present embodiment communicates with the player terminal 1500 to perform a control of providing data required for gameplay.

The game management section 210 according to the present embodiment includes an action exchange detection section 212, a presentation control section 214, a suitability input reception control section 216, a selection criterion update section 218, a replay control section 220, a progress focus control section 222, a recommended candidate action application section 224, and an evaluation control section 226. Other functional sections may be included as appropriate.

The action exchange detection section 212 detects occurrence of the action exchange in which one of a player character and an opponent character performs a first action and another one of the player character and the opponent character performs a second action to mutually exchange the actions.

Upon detection by an above-described detection means, the presentation control section 214 presents a player with a recommended candidate action recommended to be perform after an end of a stiff time (own stiff time) related to the action performed by the player character as an advice display during a replay of a match game.

Specifically, based on a first stiff time related to the first action detected as the attack exchange and a second stiff time related to the second action detected as the action exchange, when the stiff time (the own stiff time) related to the action performed by the player character is shorter than the stiff time (the opponent stiff time) related to the action performed by the opponent character, the presentation control section 214 presents an action as the recommended candidate action. The action to be presented is an attack technique that exerts an effect during the time difference (the stiff time difference) between the opponent stiff time and the own stiff time and causes damage when the action hits the opponent, and that meets a predetermined high effect condition indicating that an effect (e.g., given damage, a number of times of damage, or a long stiff time caused to the opponent) is high when it is performed and hits the opponent.

The presentation control section 214 also variably selects the action to be set as the recommended candidate action based on the play history information of the player.

The presentation control section 214 also variably selects the action to be set as the recommended candidate action based on the play history information of the player and other players by accessing the storage section that stores the play history information of the player and other players.

The presentation control section 214 also determines whether to present the recommended candidate action based on the play history information of the player. When presenting the recommended candidate action, the presentation control section 214 presents the player with a recommended input timing to perform the recommended candidate action.

When the presentation control section 214 presents a plurality of recommended candidate actions with a series of actions including a plurality of successive actions as a recommended candidate action, based on an action performed by the player character in accordance with operation input by the player after the detection by the action exchange detection section 212, the presentation control section 214 narrows down a plurality of recommended candidate actions to a series of actions following the action, and updates content of the presentation to present the narrowed-down recommended candidate action.

Then the presentation control section 214 selects and sets a timing to present the recommended candidate action based on a game progress result of the match game. The suitability input reception control section 216 performs a control of receiving suitability input by the player about a selection criterion of the action selected as the recommended candidate action after the presentation of the recommended candidate action.

The selection criterion update section 218 updates the selection criterion of the action selected as the recommended candidate action based on the received suitability input.

The replay control section 220 performs an execution control of the replay of the gameplay after the end of the gameplay.

The progress focus control section 222 performs a progress focus control for temporarily halting or slowing the progress in accordance with the detection by the action exchange detection section 212. Specifically, the progress focus control section 222 slows the progress from a timing of the detection of the action exchange (from a start timing of the preceding challenging action in the action exchange or a start timing of the stiff time of this challenging action), and temporarily halts the progress at a timing of an end of the stiff time difference.

The recommended candidate action application section 224 causes the player character to perform the recommended candidate action selected by the player from a plurality of recommended candidate actions presented by the presentation control section 214. Specifically, this corresponds to a model display control.

The evaluation control section 226 evaluates the action performed by the player character after the own stiff time, and notifies an evaluation result, when the detection is performed by the action exchange detection section 212 and the own stiff time is shorter than the opponent stiff time. The evaluation control section 226 evaluates a timing of the operation input related to the action of the player character as one of evaluation items.

The timer section 280s uses a system clock to measure the current date and time, a limited time period, and others.

The sound generation section 290s is implemented by an IC or software that generates sound data and performs decoding, and generates or decodes sound data on operation sound and background music (BGM) related to system management for the server system 1100 and the gameplay. The sound generation section 290s outputs sound signals related to the system management to the sound output section 390s.

The sound output section 390s emits the sound corresponding to the sound signals. The sound output section 390s corresponds to a speaker (not illustrated) included in the main body device 1101 or the touch panel 1108 in the example in FIG. 1.

The image generation section 292s can generate an image related to the system management for the server system 1100, a game image (or data for displaying the game image on the player terminal 1500), and the like. The image related to the system management can be output to the image display section 392s.

The image display section 392s displays various images for the system management based on the image signals input from the image generation section 292s. For example, the image display section 390s can be implemented by an image display device such as a flat panel display, a projector, or a head-mounted display. The image display section 392s corresponds to the touch panel 1108 in the example of FIG. 1.

The communication control section 294s performs data processing related to data communication, and implements data exchange with an external device through the communication section 394s.

The communication section 394s connects to the network 9 to implement communication. For example, the communication section 394s is implemented by a transceiver, a modem, a terminal adaptor (TA), a jack for wired communication cable, a control circuit, or the like. The communication section 394s corresponds to the communication device 1153 in the example in FIG. 1.

The server storage section 500s stores programs and various types of data for implementing various functions for causing the server processing section 200s to comprehensively control the server system 1100. The server storage section 500s is used as a work area for the server processing section 200s, and temporarily stores results of calculations executed by the server processing section 200s in accordance with various programs. This function is implemented by an IC memory such as a RAM or a ROM, a magnetic disk such as a hard disk, an optical disc such as a compact disc read-only memory (CD-ROM) or a digital video disc (DVD), an online storage, or the like. The server storage section 500s corresponds to a storage medium, such as the IC memory 1152 and a hard disk mounted in the main body device 1101, and the storage 1140 in the example of FIG. 1.

Figure 10:
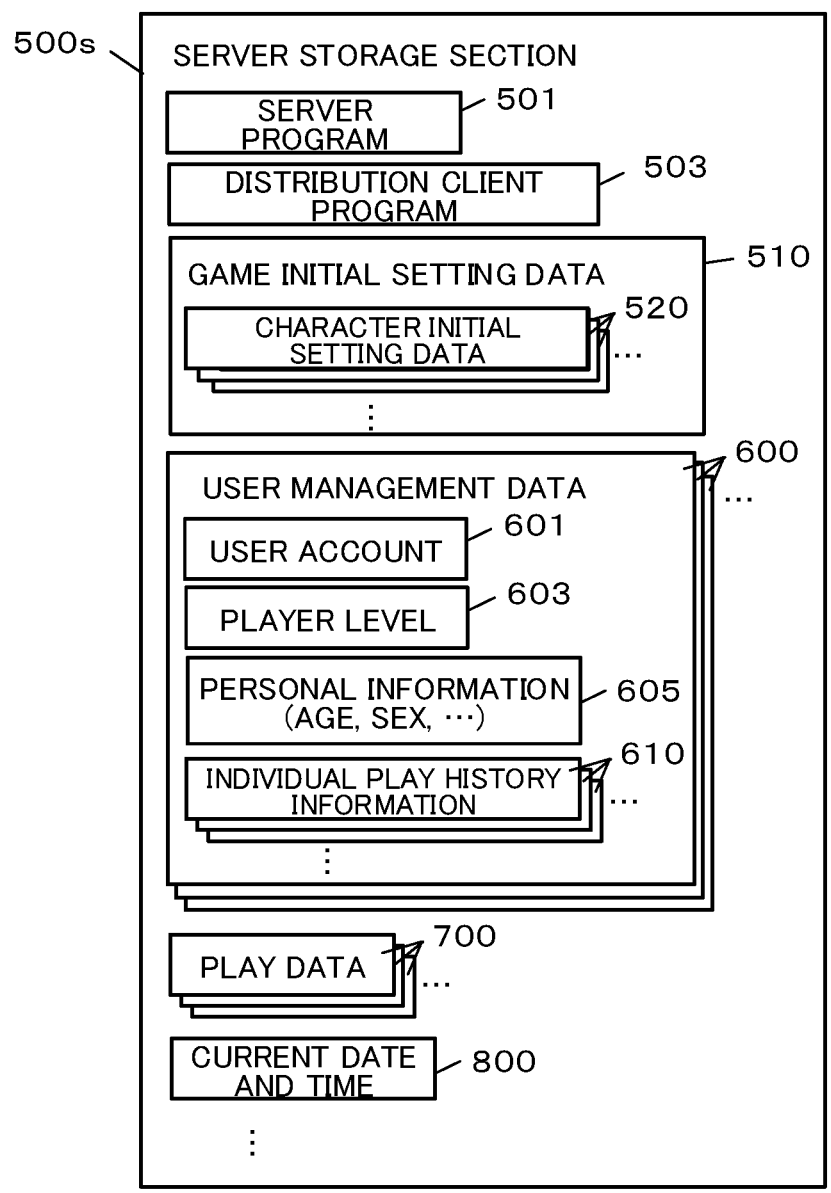
FIG. 10 is a diagram illustrating an example of programs and data stored in a server storage section according to the first embodiment.

FIG. 10 is a diagram illustrating an example of programs and data stored in the server storage section 500s according to the present embodiment. The server storage section 500s according to the present embodiment stores a server program 501, a distribution client program 503, and game initial setting data 510. The server storage section 500s stores data, sequentially generated and managed, including user management data 600, play data 700, and current date and time 800. The server storage section 500s can also store other programs and data (e.g., a timer, a counter, or various flags) as appropriate.

The server program 501 is read out and executed by the sever processing section 200s for implementing functions of the user management section 202 and the game management section 210.

The distribution client program 503 is an original of a client program that is provided to the player terminal 1500.

The game initial setting data 510 includes various types of initial setting data required for execution of the game. Specifically, the game initial setting data 510 includes character initial setting data 520. Other types of data can be included as appropriate.

Figure 11:
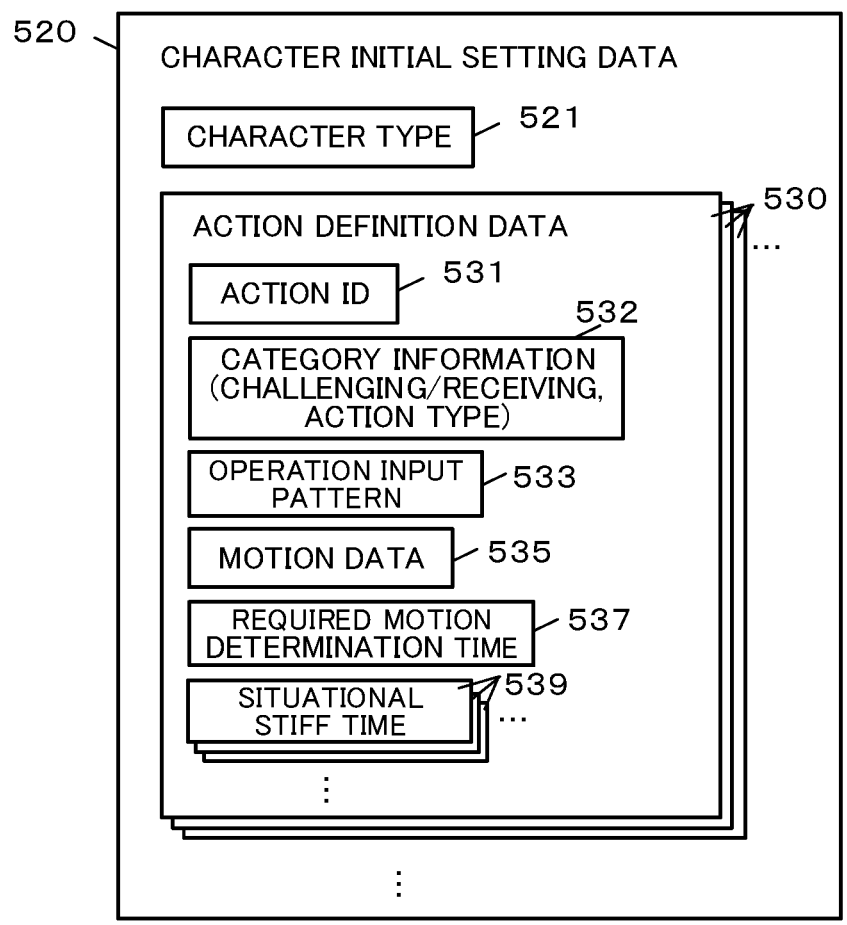
FIG. 11 is a diagram illustrating a data configuration example of character initial setting data.

The character initial setting data 520 is prepared for each type of candidate character selectable as the player character by the player, and includes various types of initial setting data related to each type of the candidate character. One piece of character initial setting data 520 includes a unique character type 521 and action definition data 530, as illustrated in FIG. 11, for example. Other types of data can be included as appropriate.

The action definition data 530 is prepared for each type of challenging action and receiving action, and includes various types of initial setting data related to the action. One piece of action definition data 530 includes a unique action ID 531, category information 532 on a classification between the challenging action and the receiving action and an action type such as punching or kicking, an operation input pattern 533 corresponding to a so-called input command, motion data 535 for causing a character to perform a motion of the action, a required motion determination time 537, and a situational stiff time 539. Other types of data can be included as appropriate.

The situational stiff time 539 includes an applicable stiff time associated with each possible situation in the game progress. The situation to be set in relation to the challenging action includes when an effect of the action does not work on an opponent (e.g., when the action misses), when a response by the opponent character is valid (e.g., when the action is blocked), when the opponent character does not respond or responds too late (e.g., when the action hits the opponent character with no guard, or it is determined that the guard is too late), or when the action crosses a challenging action by the opponent character.

The action definition data 530 also includes a "struck (receiving a challenging action with no guard)" action as one of the receiving actions.

Referring back to FIG. 10, the user management data 600 is prepared for each registered user, and includes various types of data associated with an account that is unique identification information. One piece of user management data 600 includes a user account 601, a player level 603, personal information 605 such as age and sex, individual play history information 610 (a copy of the play history information 730) of the game played by the user. Other types of data can be included in the user management data 600 as appropriate.

Figure 12:
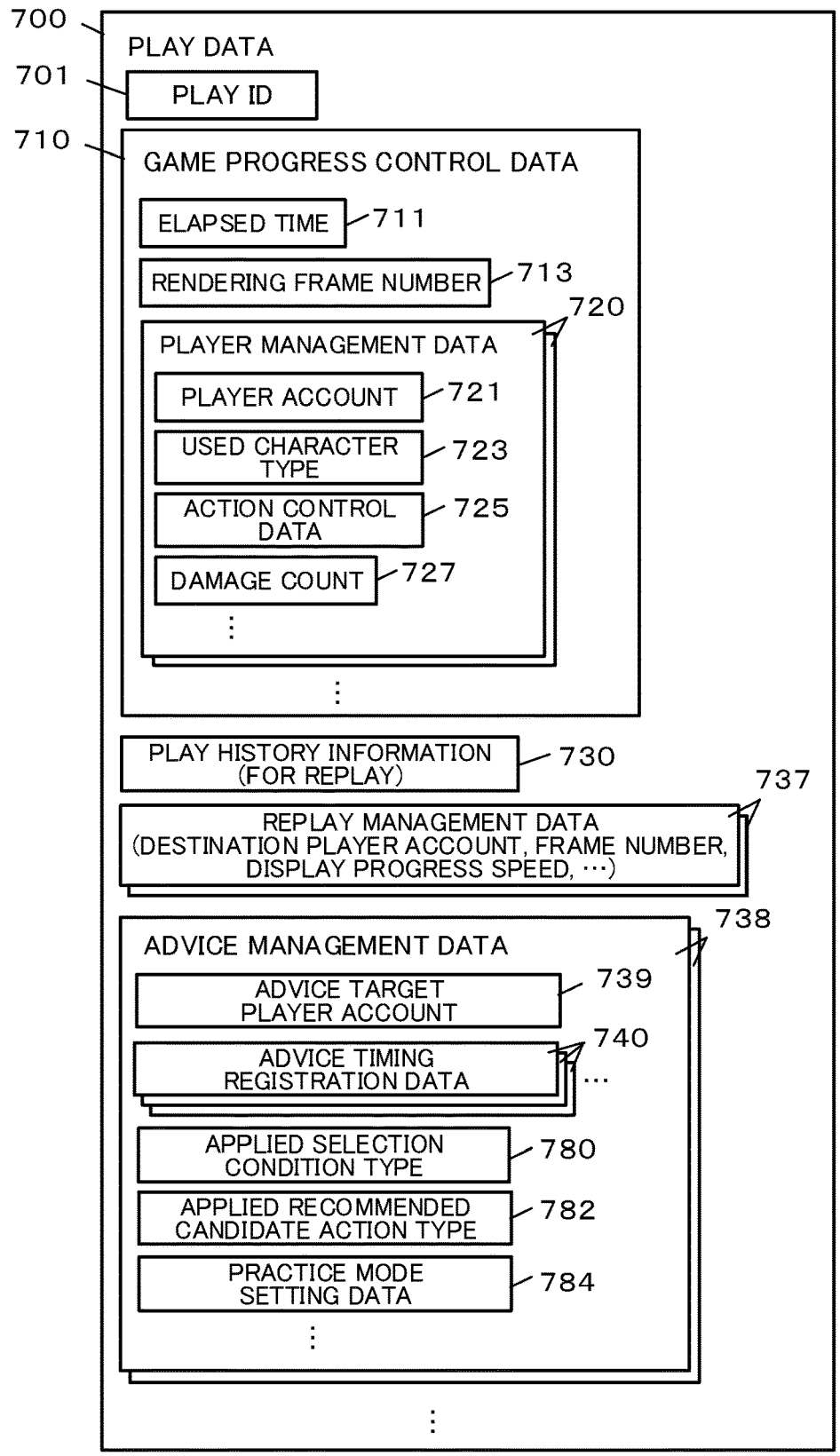
FIG. 12 is a diagram illustrating a data configuration example of play data.

The play data 700 is generated for each gameplay, and includes various types of data related to the gameplay. One piece of play data 700 includes a unique play ID 701, game progress control data 710, play history information 730, replay management data 737 prepared for each player, and advice management data 738 prepared for each player, as illustrated in FIG. 12, for example. Other types of data can be included as appropriate.

The game progress control data 710 includes various types of data for a progress control of the gameplay. For example, the game progress control data 710 includes an elapsed time 711 from a play start, a current rendering frame number 713, and player management data 720 for each player. In addition, the game progress control data 710 can also include as appropriate virtual three-dimensional space data (a group of data for disposing and controlling a background object of the game space, a character object of the player character 4, a virtual camera, or the like) for generating the game images.

The player management data 720 includes a player account 721, a used character type 723 indicating a candidate character used as the player character 4 of the player, action control data 725, and a damage count 727.

The replay management data 737 includes various types of data for displaying the replay. For example, the replay management data 737 includes a destination player account which is a target to provide the replay, a rendering frame number of the replay screen W5 (see FIG. 5), virtual three-dimensional space data for generating a replay video image 20, a setting of display progress speed of the replay video image 20.

The advice management data 738 includes various types of data for implementing the advice display. The advice management data 738 includes an advice target player account 739, advice timing registration data 740, an applied selection condition type 780, an applied recommended candidate action type 782, practice mode setting data 784, for example. Other types of data can be included as appropriate.

The advice timing registration data 740 is not generated in an initial state and is generated every time the action exchange is detected. The advice timing registration data 740 is registration data of a timing to perform the advice display including the presentation of the recommended candidate action.

Figure 13:
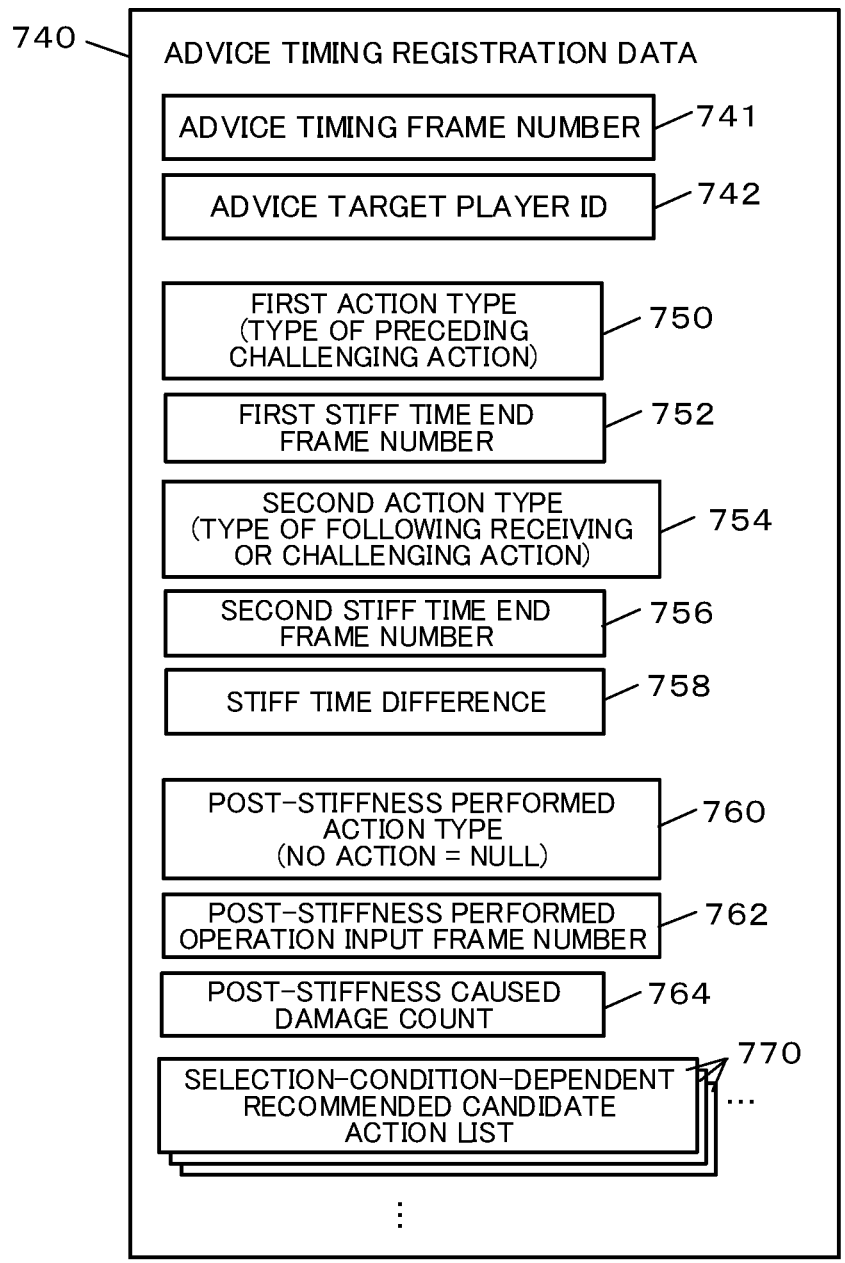
FIG. 13 is a diagram illustrating a data configuration example of advice timing registration data.

One piece of advice timing registration data 740 includes an advice timing frame number 741, an advice target player ID 742, a first action type 750, a first stiff time end frame number 752, a second action type 754, a second stiff time end frame number 756, a stiff time difference 758, a post-stiffness performed action type 760, a post-stiffness performed operation input frame number 762, a post-stiffness caused damage count 764, and a selection-condition-dependent recommended candidate action list 770, as illustrated in FIG. 13, for example. Other types of data can be included in the advice timing registration data 740 as appropriate.

The advice timing frame number 741 is a start timing of a preceding action in an action exchange related to the advice timing. The advice timing frame number 741 may be a detection timing of the action exchange.

The advice target player ID 742 indicates a player to whom the advice related to this advice timing is given.

The first action type 750 indicates a type of preceding action in the action exchange related to the advice timing. A frame number of an end of the stiff time of the preceding action is stored in the first stiff time end frame number 752.

The second action type 754 indicates a type of following action in the action exchange related to the advice timing. A frame number of an end of the stiff time of the following action is stored in the second stiff time end frame number 756.

The stiff time difference 758 is an absolute value of a difference between the second stiff time end frame number 756 and the first stiff time end frame number 752.

The post-stiffness performed action type 760 indicates a type of action performed by the player character of the advice target player within the stiff time difference related to the advice timing. That is, the post-stiffness performed action type 760 indicates a type of action performed by the player character after its own stiff time ends. An operation input timing to perform this action is stored in the post-stiffness performed operation input frame number 762, and a damage count caused to an opponent by the action is stored in the post-stiffness caused damage count 764.

The selection-condition-dependent recommended candidate action list 770 is a list generated for each type of selection condition. One selection-condition-dependent recommended candidate action list 770 is a list including actions selected from challenging actions set to the player character of the advice target player by applying a corresponding selection condition, and sorted in accordance with the selection condition.

Returning to FIG. 12, the applied selection condition type 780 indicates a type of selection condition applied when the recommended candidate action is selected. A type of an initial setting of the applied selection condition type 780 may be set as appropriate. After the initial setting, the applied selection condition type 780 is changed according to a selection condition change operation (see FIG. 5).

The applied recommended candidate action type 782 indicates a recommended candidate action that is a target of a model display or a practice selected by the advice target player. An initial value of the applied recommended candidate action type 782 is a value indicating that it is undetermined. When any one of the action selection operation icons 34 in the replay screen W5 is selected, the applied recommended candidate action type 782 stores a type of recommended candidate action corresponding to the selected operation icon (see FIG. 5).

The practice mode setting data 784 is setting data for the practice mode. For example, by causing the opponent character to perform a specific action, the practice mode setting data 784 can include setting data for performing a practice related to this situation. The practice mode setting data 784 is generated upon detection of an operation of the practice transition operation icon 52 (see FIG. 6).

Figure 14:
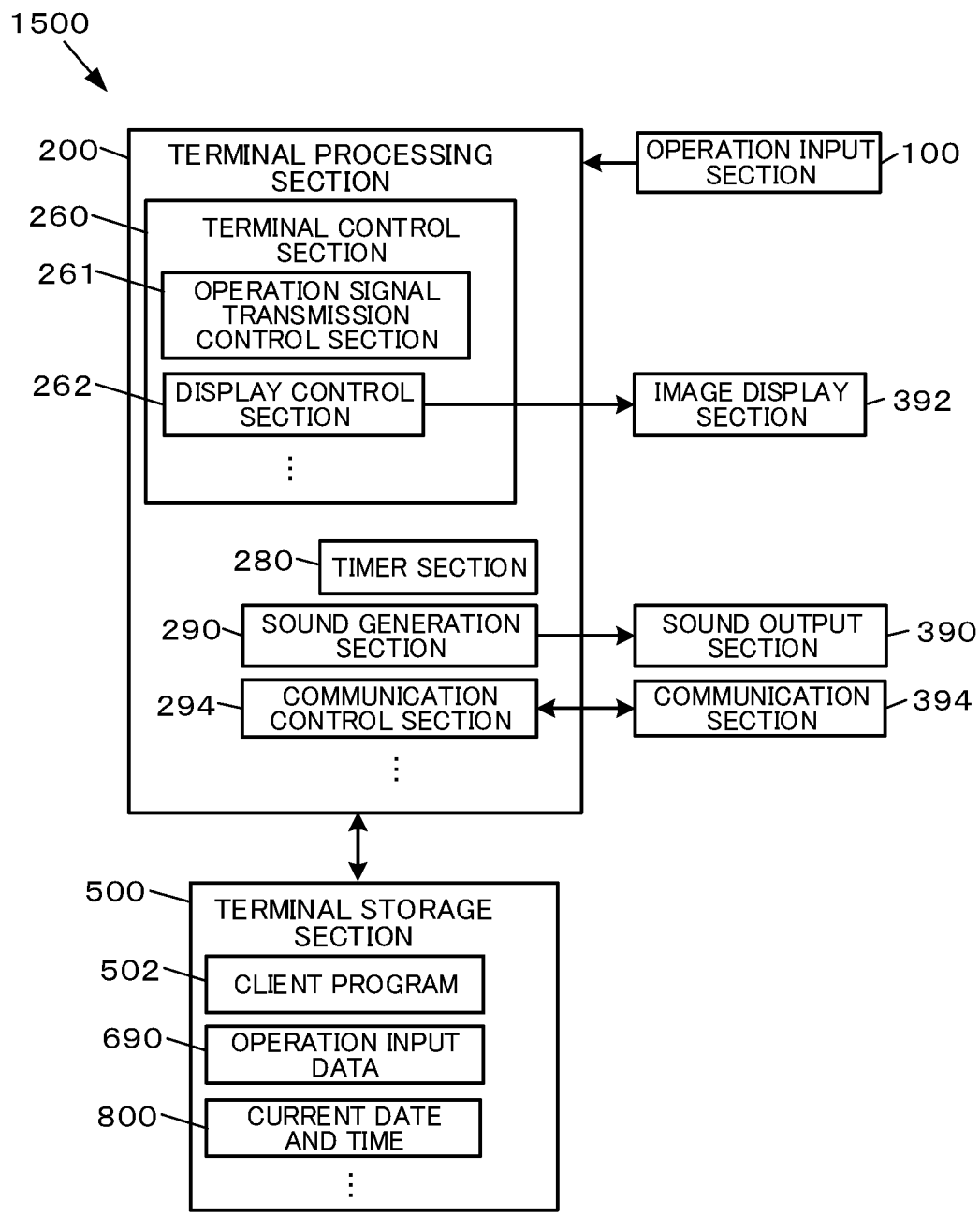
FIG. 14 is a functional block diagram illustrating a functional configuration example of the player terminal according to the first embodiment.

FIG. 14 is a functional block diagram illustrating a functional configuration example of the player terminal 1500 according to the present embodiment. The player terminal 1500 according to the present embodiment includes an operation input section 100, a terminal processing section 200, a sound output section 390, an image display section 392, a communication section 394, and a terminal storage section 500.

The operation input section 100 outputs operation input signals in accordance with various types of operation input by the player to the terminal processing section 200. The operation input section 100 can be implemented, for example, by a push switch, a joystick, a touch pad, a track ball, an accelerometer, a gyro, or a charge-coupled device (CCD) module. The operation input section 100 corresponds to the arrow key 1502, the button switch 1504, the touch panel 1506, and the camera 1520 in FIG. 2.

The terminal processing section 200 is implemented, for example, by a microprocessor such as a CPU or a GPU and electronic components such as an IC memory. The terminal processing section 200 controls input/output of data between the functional sections including the operation input section 100 and the terminal storage section 500. The terminal processing section 200 performs various calculation processes based on a predetermined program or data, operation input signals from the operation input section 100, and various types of data received from the server system 1100 to control operations of the player terminal 1500. The terminal processing section 200 corresponds to the control board 1550 in FIG. 2. The terminal processing section 200 according to the present embodiment includes a terminal control section 260, a timer section 280, a sound generation section 290, and a communication control section 294.

The terminal control section 260 includes an operation signal transmission control section 261 and a display control section 262.

The operation signal transmission control section 261 performs a process of transmitting various types of data and requests to the server system 1100 in accordance with an operation performed on the operation input section 100.

The display control section 262 performs a control for displaying a game screen based on various types of data received from the server system 1100. In the present embodiment, game space images (images of a game space taken with a virtual camera such as three-dimensional computer graphics [3DCG] images) are generated in the server system 1100, but may be generated in the player terminal 1500. In this case, the display control section 262 also performs a control of objects arranged in a virtual three-dimensional space for generating 3DCG, for example.

The sound generation section 290 is implemented, for example, by a processor such as a digital signal processor (DSP) or a sound synthesizing IC, or an audio codec for playing a sound file. The sound generation section 290 generates sound signals for sound effects, BGM, or various types of operational sounds, and outputs the signals to the sound output section 390.

The sound output section 390 is implemented by a device that outputs sounds such as sound effects and BGM based on the sound signal input from the sound generation section 290. The sound output section 390 corresponds to the speaker 1510 in FIG. 2.

The image display section 392 displays various images based on the image signals input from the display control section 262. For example, the image display section 392 can be implemented by an image display device, such as a flat panel display, a cathode ray tube (CRT), a projector, or a head-mounted display. The image display section 392 corresponds to the touch panel 1506 in FIG. 2 according to the present embodiment.

The communication control section 294 performs data processing related to data communication, and implements data exchange with an external device through the communication section 394. The communication section 394 connects to the network 9 to implement communication. For example, the communication section 394 is implemented by a transceiver, a modem, a terminal adaptor (TA), a jack for wired communication cable, a control circuit, or the like. The communication section 394 corresponds to the wireless communication module 1553 in FIG. 2.

The terminal storage section 500 stores a program and various types of data for implementing functions for causing the terminal processing section 200 to comprehensively control the player terminal 1500. The terminal storage section 500 is also used as a work area for the terminal processing section 200, and temporarily stores results of calculations executed by the terminal processing section 200 in accordance with various programs, input data input from the operation input section 100, or the like. These functions are implemented by an IC memory such as a RAM or a ROM, a magnetic disk such as a hard disk, an optical disc such as a CD-ROM or a DVD. The terminal storage section 500 corresponds to the IC memory 1552 included in the control board 1550 and the memory card 1540 in FIG. 2. Alternatively, an online storage may be used.

The terminal storage section 500 according to the present embodiment stores a client program 502, operation input data 690, current date and time 800, or the like. Other programs and data can be stored as appropriate.

The client program 502 is application software that is read out and executed by the terminal processing section 200 to implement a function of the terminal control section 260. In the present embodiment, the client program 502 is a copy of the distribution client program 503 (see FIG. 10) provided from the server system 1100.

The client program 502 may be an exclusive client program or include a web browser program and a plugin that implements an interactive image display, depending on a technique and a method for implementing an online game.

Next, operation of the game system 1000 is described.

Figure 15:
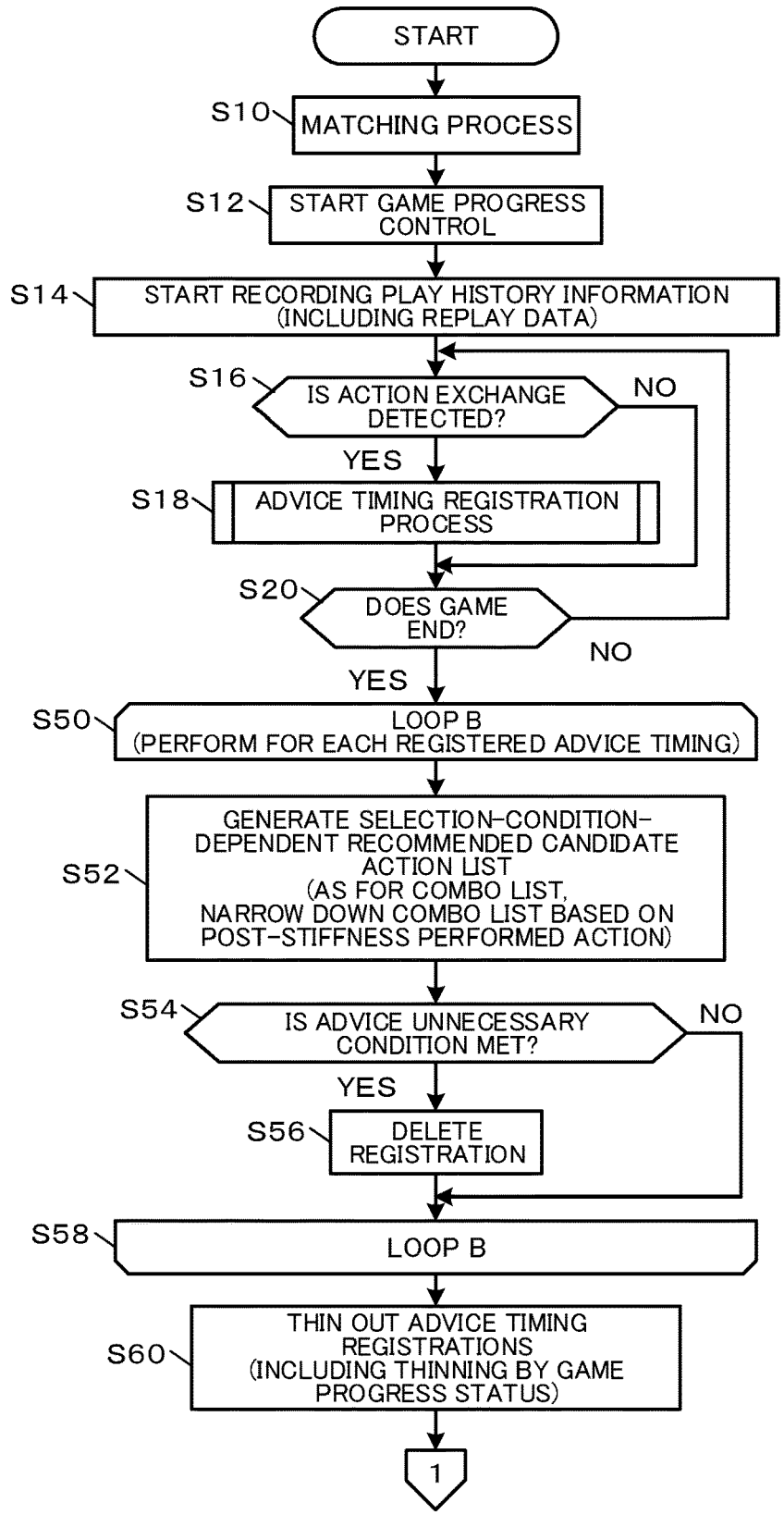
FIG. 15 is a flowchart of a flow of a process in the server system according to the first embodiment.
Figure 16:
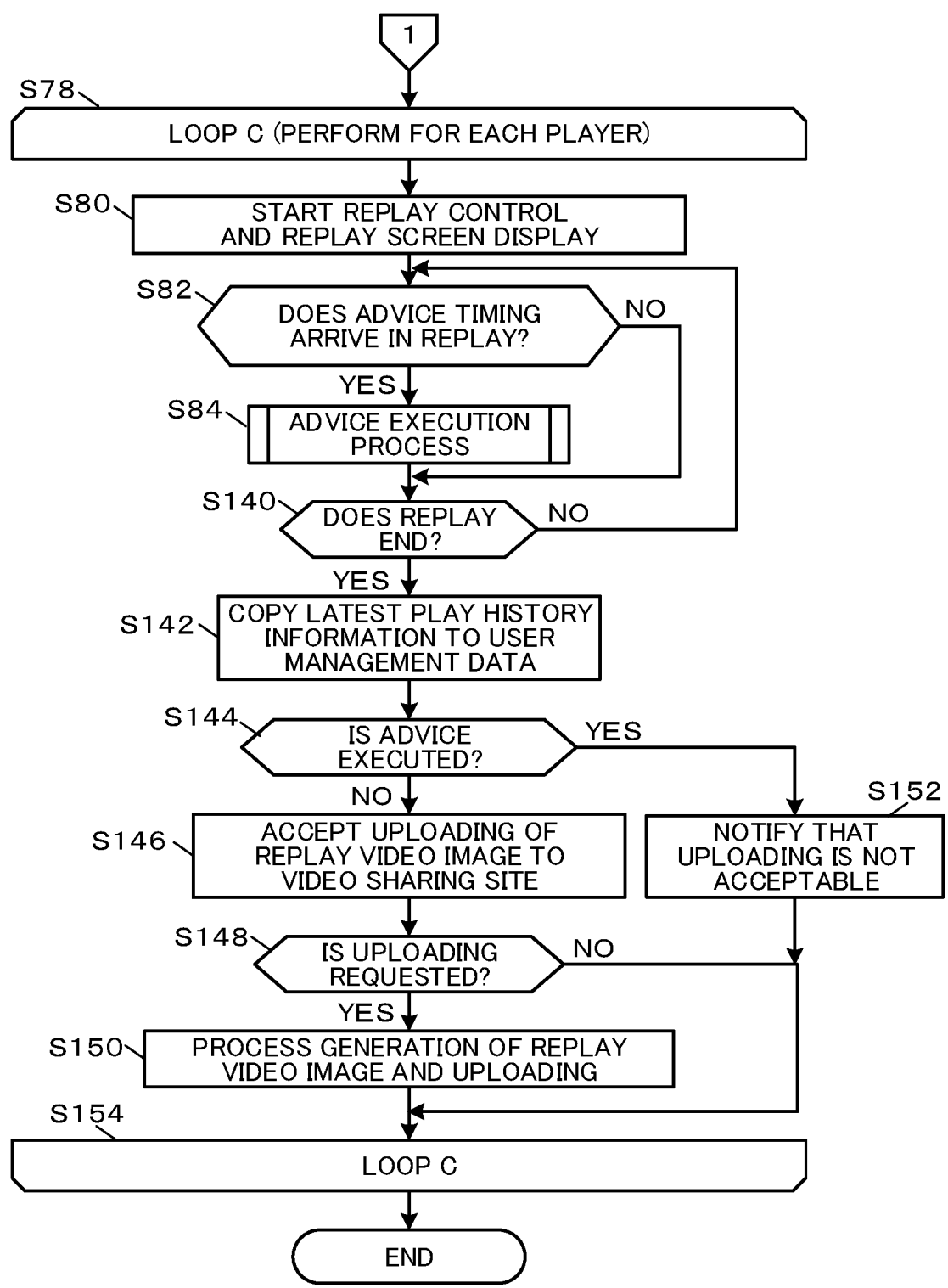
FIG. 16 is a flowchart continuing from FIG. 15.

FIGS. 15 and 16 are flowcharts of a flow of a process performed by the server system 1100. The flow of the process as described herein is implemented by the server processing section 200s executing the server program 501.

As illustrated in FIG. 15, the server system 1100 performs matching (step S10). In the matching, the server system 1100 receives selection of a candidate character used as a player character from each player.

The server system 1100 creates a game space in a virtual three-dimensional space, initially disposes the player characters and a virtual camera, and then starts a game progress control (step S12). The server system 1100 starts recording the play history information 730 (see FIG. 3) of the current game (step S14).

The server system 1100 performs an advice timing registration process every time an action exchange is detected (YES in a step S16) until the game ends (step S18).

Figure 17:
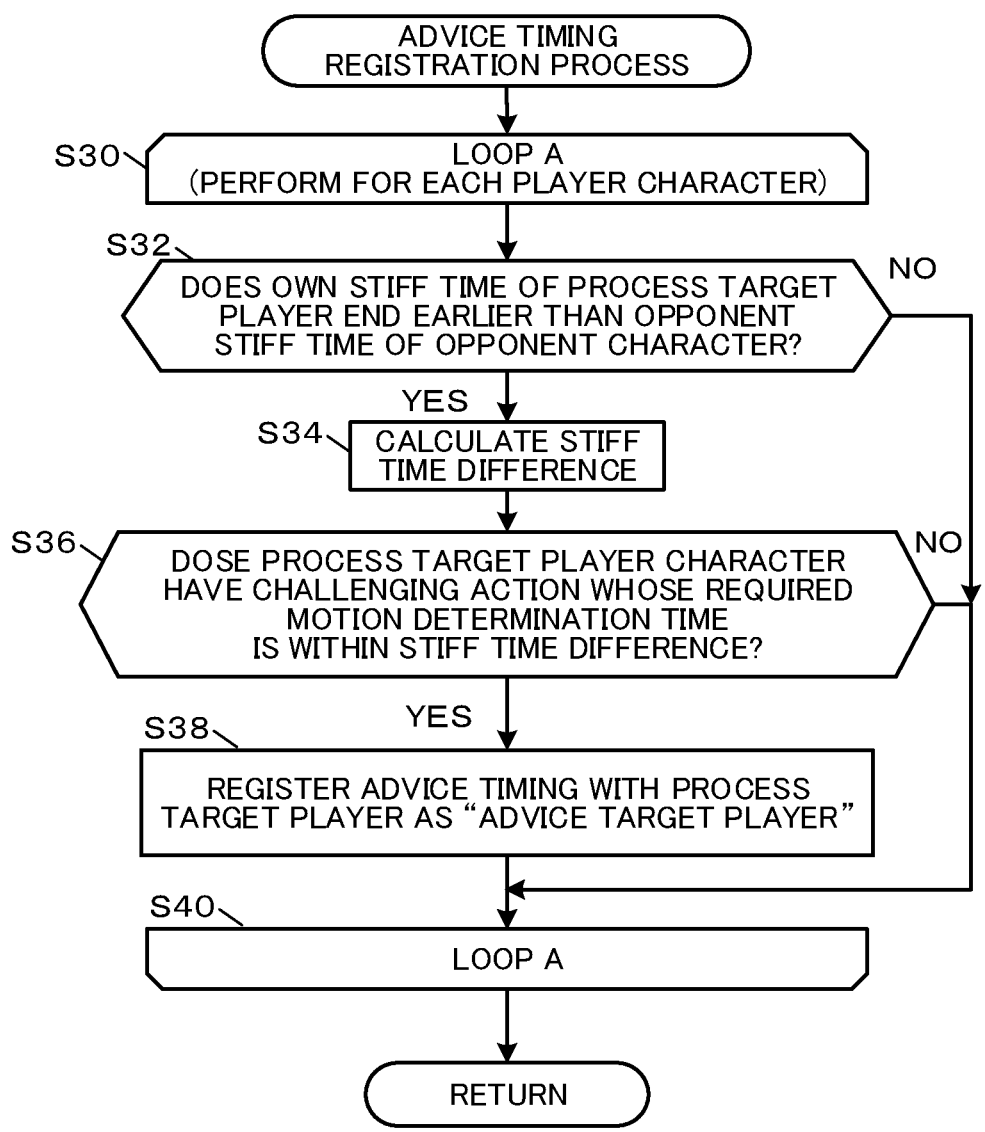
FIG. 17 is a flowchart of a flow of an advice timing process.

FIG. 17 is a flowchart of a flow of the advice timing registration process. In this process, the server system 1100 performs a loop A for each player character related to the detected action exchange (steps S30 to S40).

In the loop A, the server system 1100 determines whether an own stiff time of a process target player character ends earlier than an opponent stiff time of an opponent character (step S32). When it is positive (YES in the step S32), the server system 1100 calculates a stiff time difference (step S34), and determines whether there is a challenging action whose required motion determination time is equal to or less than the calculated stiff time difference in challenging actions that can be performed by the process target player character (step S36).

In other words, the server system 1100 determines whether there is an action that can exert an effect within the stiff time difference and that does not receive a counterattack from the opponent in a next stiff time difference related to the stiff time of this action.

When there is a corresponding challenging action (YES in the step S36), the server system 1100 registers an "advice timing" with the player using the process target player character as an "advice target player" (step S38). As a result, a new piece of advice timing registration data 740 (see FIG. 13) is generated. Then, the loop A ends (step S40). After performing the loop A to all the player characters 4 related to the detected action exchange, the server system 1100 terminates the advice timing registration process.

When any of the player characters 4 related to the detected action exchange is a computer-controlled character (an automatically controlled character in a single play against a computer), the computer-controlled character is not subject to the process of the loop A.

Returning to FIG. 15, after completing the advice timing registration process, the server system 1100 determines whether the game has ended. When the game has ended (YES in a step S20), the server system 1100 performs a loop B for each advice timing registration (steps S50 to S58).

In the loop B, the server system 1100 first generates a selection-condition-dependent recommended candidate action list 770 for each type of selection condition (step S52). In order to generate the selection-condition-dependent recommended candidate action list 770 in the "combo order", the server system 1100 performs a narrowed search for a combo pattern following an action indicated by the post-stiffness performed action type 760.

Next, the server system 1100 determines whether the advice timing registration serving as a process target meets a predetermined advice unnecessary condition. When it is positive, (YES in a step S54), the server system 1100 deletes the registration of the advice timing registration of the process target (step S56).

The "advice unnecessary condition" as used herein is a condition for regarding that the advice is not necessary or not meaningful so much, and includes examples below.

(1) The advice target player is a high-level player satisfying a predetermined skilled player requirement, that is, the advice target player is at a level so high that he/she does not need the advice.

(2) According to the replay data in the individual play history information 610 of the advice target player in the past, a recommended candidate action that is highly ranked in the selection-condition-dependent recommended candidate action list 770 has been successfully performed within the stiff time difference at a probability equal to or higher than a predetermined value.

(3) Damage caused to the opponent by the action performed in the stiff time difference is equal to or higher than a predetermined threshold.

Accordingly, with an appropriate setting of the advice unnecessary condition, it is possible to determine whether to present the advice in accordance with the play history or game progress status of the advice target player in the steps S54 to S56.

Next, the server system 1100 thins out similar advice timing registrations (step S60). Specifically, the server system 1100 extracts advice timing registrations with the same advice target player ID 742, first action type 750, and second action type 754 (see FIG. 13), regards that these extracted registrations are in similar situations, and deletes the extracted registrations except for one to three of them. Nevertheless, when a number of remaining advice timing registrations exceeds a predetermined upper limit value, the server system 1100 regards registrations as having lower priority to advise in ascending order from a registration having a smallest post-stiffness caused damage count 764 (one of game progress results of the gameplay at the advice timing) and deletes the registrations until the number of registrations becomes equal to or smaller than the upper limit value.

Since the registered advice timings is thinned out to an appropriate number of times before starting a replay control, it is possible to prevent annoyance given to a user due to frequent occurrence of the advice display during the replay.

Moving to FIG. 16, the server system 1100 performs a loop C for each player (steps S78 to S154).

In the loop C, the server system 1100 starts the replay control, and displays the replay screen W5 on the player terminal 1500 of the process target player (step S80). When a timing indicated by the advice timing registration data 740 arrives during the replay (YES in a step S82), the server system 1100 performs an advice execution process (step S84).

Figure 18:
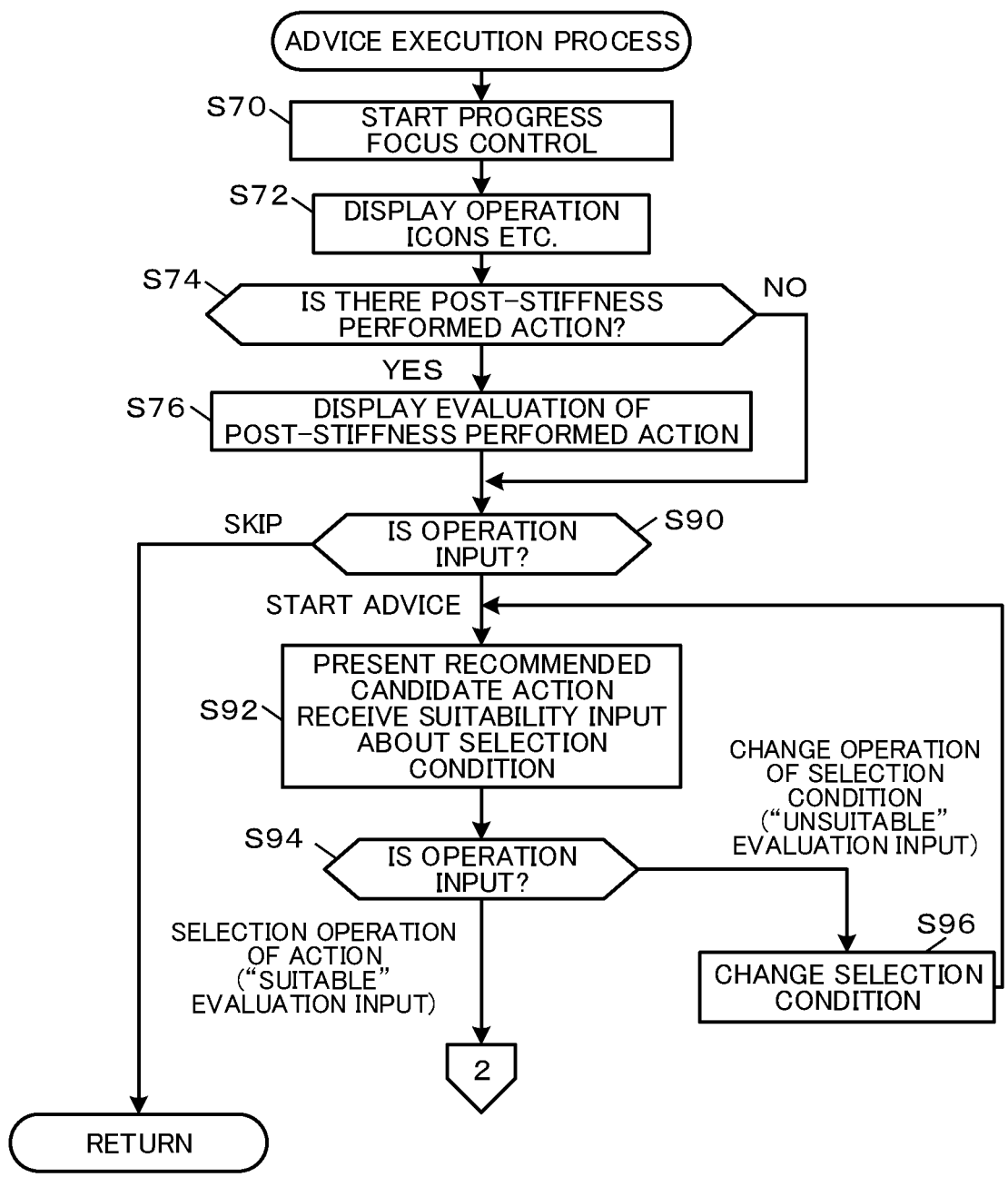
FIG. 18 is a flowchart of a flow of an advice execution process.
Figure 19:
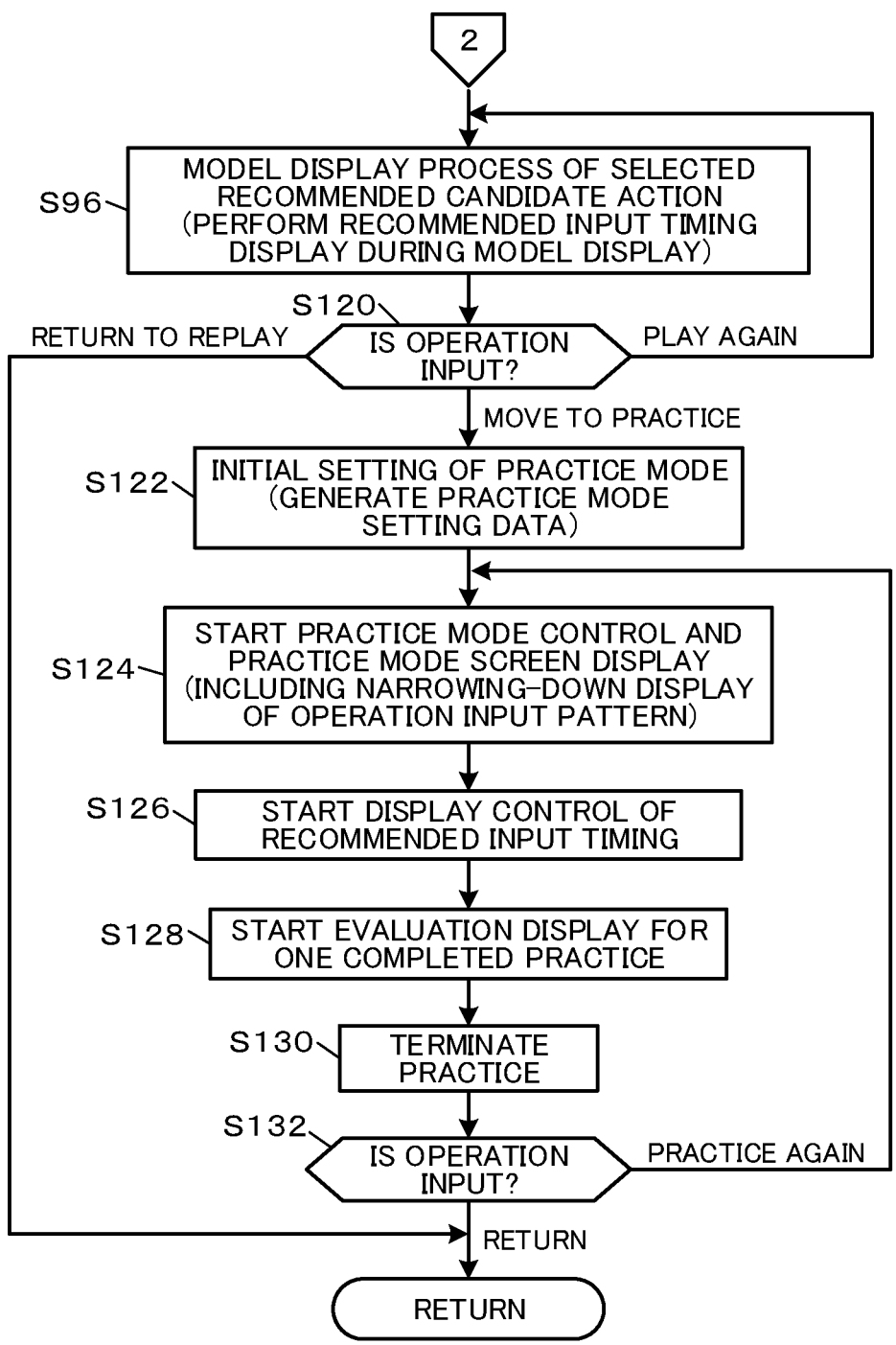
FIG. 19 is a flowchart continuing from FIG. 18.

FIGS. 18 and 19 are flowcharts of a flow of the advice execution process. As illustrated in FIG. 18, the server system 1100 first starts a progress focus control in the process (step S70). Specifically, the server system 1100 performs a slow-motion replay and a temporary halt control of display progress in a replay video image 20 (see FIG. 5). Then, the server system 1100 displays the operation icons such as the chance timing display 24, the start operation icon 26, or the skip operation icon 27 (step S72).

When the player character of the process target player of the loop C has performed a challenging action or a receiving action in the stiff time difference related to the advice timing, the server system 1100 regards that a post-stiffness performed action has been performed (YES in a step S74), performs evaluation of the action, and displays an evaluation result on the replay screen.

The evaluation is performed on a type of the post-stiffness performed action and an operation input timing for the action.

As for the type of the action, when the type corresponds to a first item in the selection-condition-dependent recommended candidate action list 770 in the "high-effect-by-single-action order", the server system 1100 displays an evaluation result stating "excellent choice". When the type corresponds to a second or third item, the server system 1100 displays "good choice: better technique available". When the type corresponds to a fourth or lower item, the server system 1100 displays "much better technique available".

As for the operation input timing, the server system 1100 displays an evaluation result such as "excellent", "great", or "good" each corresponding to a difference in number of frames between the end of the own stiff time and the post-stiffness performed operation input frame number 762 in ascending order.

Next, when a predetermined advice start operation is input ("start advice" in a step S90), the server system 1100 presents a recommended candidate action, and receives suitability input about a selection condition (step S92). Specifically, the server system 1100 displays the recommended candidate action presentation section 30 (see FIG. 5) based on the selection-condition-dependent recommended candidate action list 770 corresponding to the selection condition indicated by the applied selection condition type 780 at this time.

In response to input of a change operation of the selection condition ("change operation of selection condition" in a step S94), the server system 1100 changes a setting of the applied selection condition type 780 (step S96), and returns to the step S92. After returning to the step S92, the server system 1100 updates content of the recommended candidate action presentation section 30 based on the selection-condition-dependent recommended candidate action list 770 corresponding to the changed selection condition.

When a selection operation of the presented recommended candidate action is input ("selection operation of action" in the step S94), moving to FIG. 19, the server system 1100 performs a model display process of the selected recommended candidate action, such as performing a display control of the model video image 40, and displaying the model target action name 42, the operation input pattern display 44, the first timing display 46, the second timing display 48, the repeat display operation icon 50, the practice transition operation icon 52, the replay return operation icon 54, or the like (step S96; see FIG. 6).

When an operation input for practice transition is performed ("move to practice" in a step S120), the server system 1100 performs various initial settings including the practice mode setting data 784 or the like for a practice mode control (step S122; see FIG. 12). Then, the server system 1100 starts the practice mode control, and starts a display of the practice mode screen W7 on the player terminal 1500 of the process target player of the loop C (step S124; see FIG. 7).

At the same time, the server system 1100 starts a notification display of a recommended input timing (step S126), an evaluation process of the recommended input timing, and a display of an evaluation result (step S128).

The opponent character of the process target player (the advice target player) of the loop C automatically starts a motion set by the practice mode setting data 784, and the player performs operation input for the recommended candidate action to be practiced, referring to the notification display of the input timing. One-time operation input completes the practice once (step S130).

After the end of the practice, the server system 1100 displays the repeat practice operation icon 66 and the replay return operation icon 68 (see FIG. 7).

When a repeat practice operation is input ("practice again" in a step S132), the process returns to the step S124. When a replay return operation is input ("return" in the step S132), the server system 1100 terminates the advice execution process and terminates advice presentation at the current advice timing.

Returning to FIG. 16, the server system 1100 repeats the advice execution process every time the advice timing arrives until the replay ends (NO in a step S140). When the replay ends (YES in the step S140), the server system 1100 copies the play history information 730 (see FIG. 12) on the latest gameplay to the user management data 600 of the process target player of the loop C, i.e., the advice target player (step S142; the individual play history information 610 in FIG. 10).

Next, the server system 1100 determines whether the advice execution has been performed to the process target player. The initial value of the applied recommended candidate action type 782 (see FIG. 12) in the advice management data 738 of the player is a value indicating that it is undetermined, and a value indicating any one of actions is set when the advice start operation is input. Thus, the server system 1100 can determine whether the advice execution has been performed from the value of the applied recommended candidate action type 782.

When the advice execution has not been performed (NO in a step S144), the server system 1100 accepts uploading of the replay video image 20 to a video sharing site (step S146). When input of a predetermined uploading request operation is detected (YES in a step S148), the server system 1100 generates a video file of the replay video image 20, performs an uploading process of uploading the file to the predetermined video sharing site (step S150), and terminates the loop C (step S154).

On the other hand, when the advice execution has been performed (YES in the step S144), the server system 1100 notifies that a request for uploading the replay video image 20 to the video sharing site cannot be accepted (step S152), and terminates the loop C (step S154).

When the process of the loop C for each player is completed, the server system 1100 terminates a series of processes.

Accordingly, according to the present embodiment, in the game using the character set with the stiff time, the advice taking advantage of the stiff time difference can be given to the player. That is, when the time difference occurs between the stiff times due to the action exchange, and the player character can be made to perform the action taking advantage of the time difference, the recommended candidate action can be presented to the player. The player can know specifically how to use the time difference by the presentation.

Second Embodiment

Next, a second embodiment is described.

The present embodiment is different in that a stationary consumer game device is used as the player terminal 1500, and a function of the game management section 210 is performed on a side of the player terminal 1500. The following mainly describes differences from the first embodiment. Components that are the same as those in the first embodiment are denoted with the same referential numerals, and duplicate description is omitted.

Figure 20:
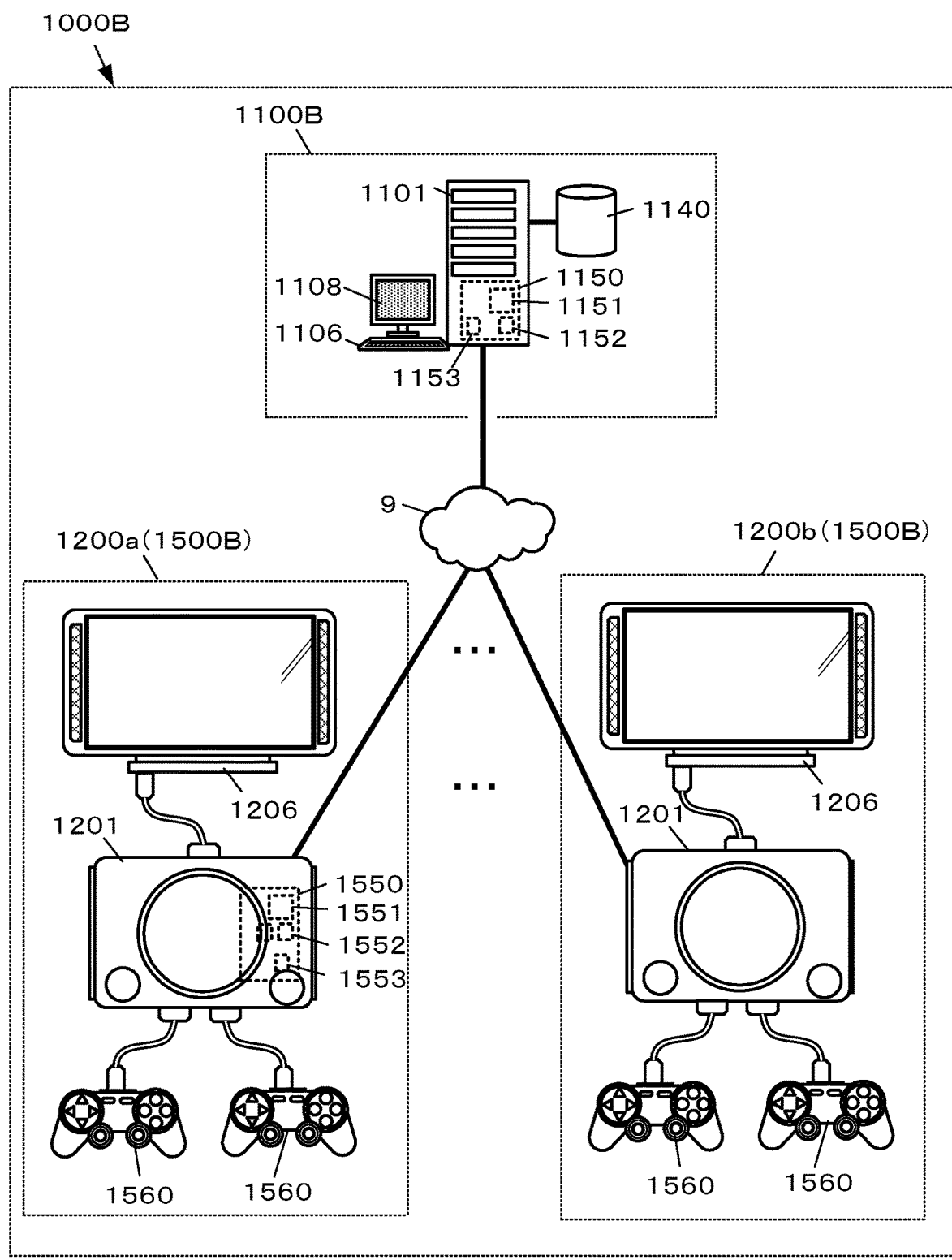
FIG. 20 is a diagram illustrating a configuration example of a game system according to a second embodiment.

FIG. 20 is a diagram illustrating a configuration example of a game system 1000B according to the present embodiment.

A player terminal 1500B according to the present embodiment is implemented by a stationary consumer game device 1200 (1200a, 1200b, . . . ). The stationary consumer game device 1200 includes a main body device 1201, a video monitor 1206, and a plurality of game controllers 1260, and a plurality of players can perform a match play with single stationary consumer game device 1200.

Figure 21:
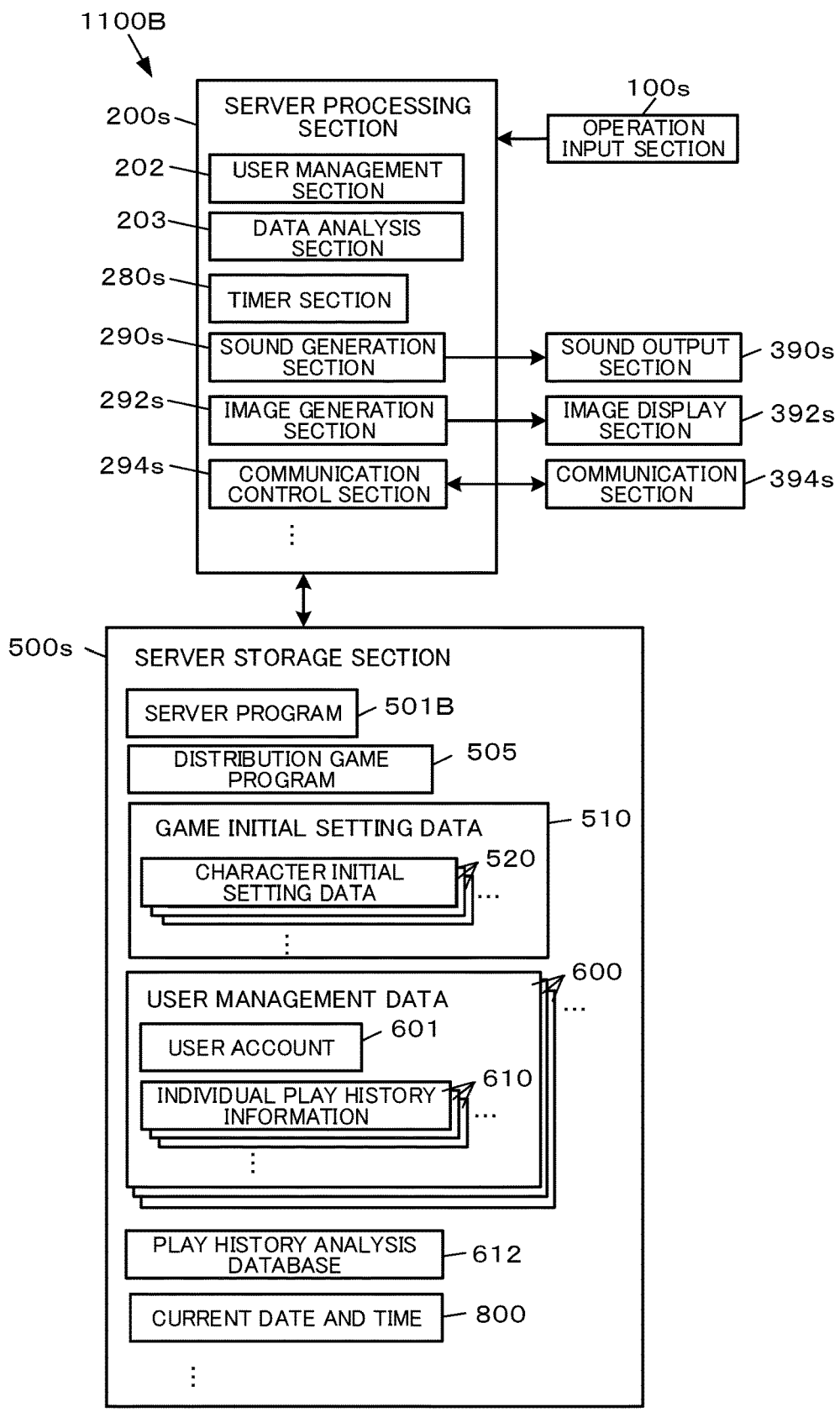
FIG. 21 is a functional block diagram illustrating a functional configuration example of a server system according to the second embodiment.

FIG. 21 is a functional block diagram illustrating a functional configuration example of a server system 1100B according to the present embodiment. The server system 1100B executes a server program 501B to implement functions as the user management section 202 and a data analysis section 203.

The data analysis section 203 generates and periodically updates a play history analysis database 612 with the individual play history information 610 in the user management data 600 as an analysis target.

The play history analysis database 612 stores data on which classification, searching, and narrowing that are performed in selecting the recommended candidate action based on the selection condition in the "trend order" have been performed in advance.

The play history analysis database 612 classifies a lot of play history information by age and a player level of a player and further by a combination of a first character and a second character, for example. A classified population includes list data of actions performed by the first character taking advantage of the stiff time difference in order of a number of adopted times, and list data of actions performed by the second character taking advantage of the stiff time difference in order of a number of adopted times, for each stage of a length of the stiff time difference. In addition, a classified population may include data classified, narrowed-down, and sorted based on another viewpoint, such as data of combo patterns in order of popularity.

Figure 22:
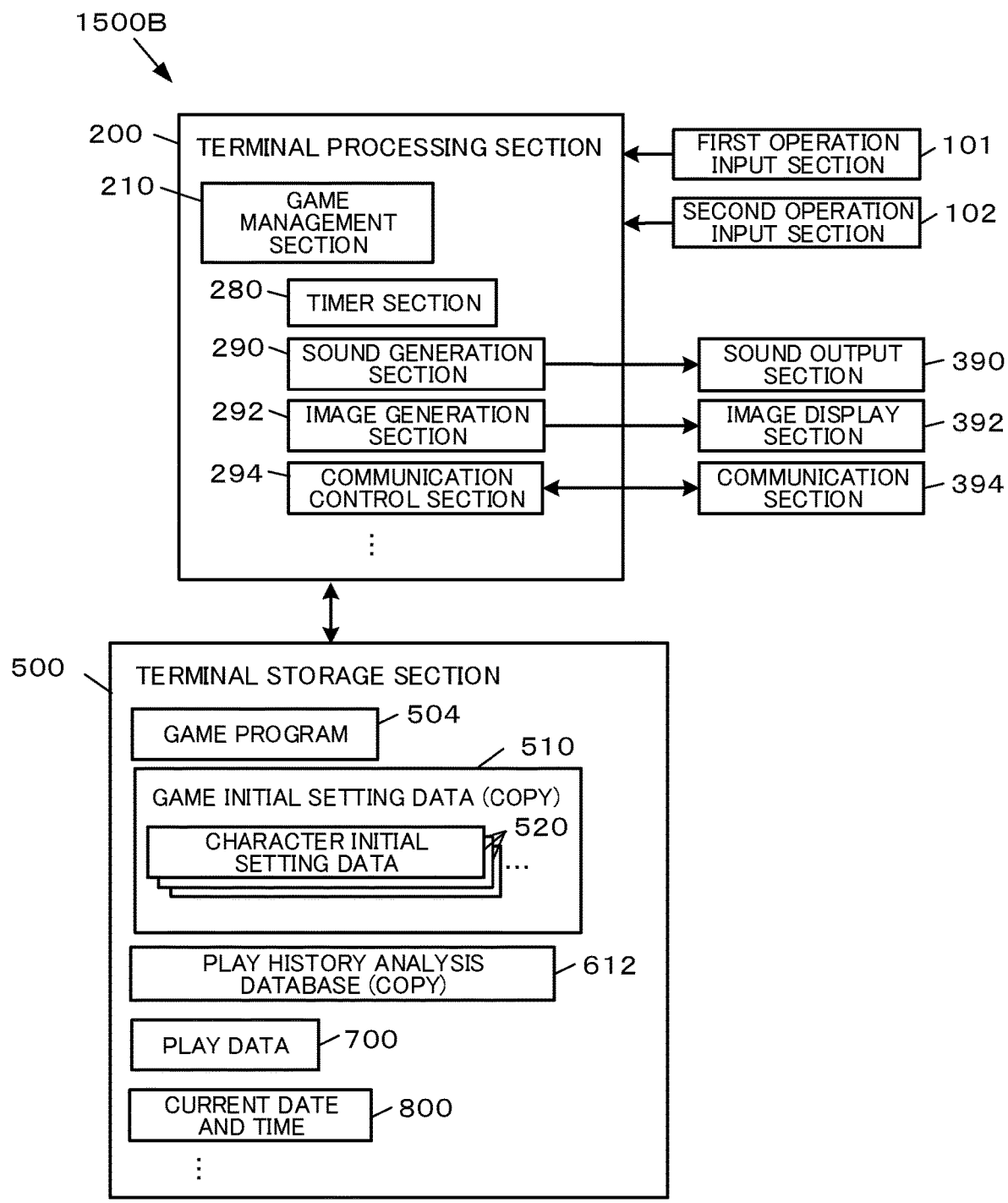
FIG. 22 is a functional block diagram illustrating a functional configuration example of a player terminal according to the second embodiment.

FIG. 22 is a functional block diagram illustrating a functional configuration example of the player terminal 1500B.

The player terminal 1500B includes the game management section 210 and the image generation section 292 instead of the terminal control section 260 (see FIG. 14).

The image generation section 292 generates images serving as a foundation of a game screen, composites images, and outputs image signals to display the images on the image display section 392.

The terminal storage section 500 of the player terminal 1500B stores a game program 504, the game initial setting data 510, the play history analysis database 612, and the play data 700.

The game program 504, the game initial setting data 510, and the play history analysis database 612 are copies of originals stored in the server system 1100B, and are downloaded to be stored and updated before starting the game. When the recommended candidate action list is generated in the player terminal 1500B, the player terminal 1500B communicates with the server system 1100B and refers to the downloaded play history analysis database 612.

The flow of the process in the player terminal 1500B is similar to that of the flowchart in FIGS. 15 to 19. That is, an executing subject of various processes and controls is required to be changed from the server system 1100 to the player terminal 1500. As for the steps requiring access to the user management data 600 (see FIG. 10), the player terminal 1500B communicates with the server system 1100B each time to implement the steps, or refers to the play history analysis database 612 previously downloaded to the terminal storage section 500.

Thus, the present embodiment can provide the same advantageous effects as those in the first embodiment.

MODIFICATION EXAMPLES

The embodiments to which the present disclosure is applied are described so far. However, the modes to which the present disclosure is applicable are not limited to the above-described embodiments, and the components can be added, omitted, or changed as appropriate.

Modification Example 1

For example, in the above-described embodiments, an online game is implemented in a client-server computer system. Alternatively, the online game may be implemented in a computer system (a game system) in which a plurality of player terminals 1500, or game devices, are connected in a peer-to-peer fashion. In such a case, any one of the plurality of player terminals 1500 performs the functions of the server system 1100 according to the above-described embodiments. Alternatively, the plurality of player terminals 1500 may share the functions of the game management section 210.

Modification Example 2

Furthermore, in the above-described embodiments, a multi-play game is adopted as a play mode. Alternatively, the present disclosure may also be applicable to games in a single play mode. In such a case, the opponent character against the player character is automatically controlled by a computer based on a given algorithm. Accordingly, the processes related to the advice display for the opponent character (substantially a non-player character) or the player thereof (the computer) can be omitted as appropriate.

Modification Example 3

Furthermore, in the above-described embodiments, the detection of an action exchange and the advice timing registration process (the steps S16 and S18 in FIG. 15) are performed during the gameplay. Alternatively, the detection and the process may be performed as a preparation process before starting the replay after the gameplay by referring to the replay data of the gameplay. Specifically, if it is described based on the first embodiment, the steps S16 and S18 in FIG. 15 may be performed between the steps S20 and S50.

Modification Example 4

Furthermore, in the above-described embodiments, it is clearly described that the recommended candidate action is presented in a situation where the stiff time difference occurs. However, from another viewpoint of the embodiments, it can be said that the recommended candidate action is presented to the player using the player character based on the stiff time after the end of the stiff time when the stiff time occurs to the player character due to the action. In addition, regardless of the occurrence of the stiff time difference, an action for which the operation input is recommended to be performed at a moment when the stiff time ends (e.g., an action requiring a few times of pressing a button) may be presented as the recommended candidate action, for example. Moreover, an action requiring a complicated input operation may be presented as the recommended candidate action after a big action whose stiff time satisfies a predetermined long time condition (that a length is longer than a length of a standard stiff time), or an action requiring a simple input operation may be presented as the recommended candidate action after a small action whose stiff time satisfies a predetermined short time condition (that a length is shorter than the length of the standard stiff time).

Modification Example 5

Furthermore, in the above-described embodiments, the fighting game is described. Alternatively, the present disclosure can also be applicable to games in genres other than the fighting game if the games include a player character whose action is set with the stiff time.

For example, the present disclosure can be applied to a role-playing game (RPG) including a player character set with a chanting action for casting a spell, or a summoning action for summoning a beast. In such cases, the stiff time is set to the chanting action or the summoning action. For example, the present disclosure can be applied when the action is set such that the summoned beast performs an attack action using the required motion determination time and an effect display of return to an original world is performed in the stiff time.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A computer system comprising:
at least one processor or circuit programmed to:
control execution of an electronic video game in which a player character and an opponent character have a real-time match;
detect occurrence of an action exchange in which one of the player character and the opponent character performs a first action and another one of the player character and the opponent character performs a second action to mutually exchange the actions, the first action being generated based on a signal from a first player terminal, and the second action being generated based on a signal from a second player terminal; and
control a display to display a recommended candidate action that is executable by the player character and recommended to be performed after an end of an own stiff time to a player controlling the player character, based on the own stiff time related to the action performed by the player character, upon detection of the action exchange, the own stiff time being a predetermined length of time during which operations for controlling the player character that are input on one of the first player terminal or the second player terminal are not executed in the electronic video game.

2. The computer system as defined in claim 1, wherein controlling the display of the recommended candidate action includes performing the display when the own stiff time is shorter than an opponent stiff time related to the action performed by the opponent character.

3. The computer system as defined in claim 2, wherein controlling the display of the recommended candidate action includes presenting the player with an action that exerts an effect within a time difference between the opponent stiff time and the own stiff time as the recommended candidate action.

4. The computer system as defined in claim 2, wherein controlling the display of the recommended candidate action includes presenting the player with an action that is an attack technique to cause damage and exerts an effect within a time difference between the opponent stiff time and the own stiff time, and that meets a predetermined high effect condition indicating that large damage is caused when the action is performed and hits the opponent, as the recommended candidate action.

5. The computer system as defined in claim 1, wherein controlling the display of the recommended candidate action includes variably selecting an action to be presented as the recommended candidate action based on a character type of the player character.

6. The computer system as defined in claim 1, wherein controlling the display of the recommended candidate action includes variably selecting an action to be presented as the recommended candidate action based on play history information of the player.

7. The computer system as defined in claim 1, wherein controlling the display of the recommended candidate action includes variably selecting an action to be presented as the recommended candidate action based on play history information of the player and play history information of other players.

8. The computer system as defined in claim 1, wherein controlling the display of the recommended candidate action includes selecting an action to be presented as the recommended candidate action in accordance with a given selection criterion, and
the at least one processor or circuit is further programmed to
receive suitability input from the player about the selection criterion after the presentation of the recommended candidate action, and
update the selection criterion based on the received suitability input.

9. The computer system as defined in claim 1, wherein controlling the display of the recommended candidate action includes determining whether to present the recommended candidate action based on play history information of the player.

10. The computer system as defined in claim 1, wherein controlling the display of the recommended candidate action includes presenting the player with a recommended input timing to perform the recommended candidate action.

11. The computer system as defined in claim 1, wherein the at least one processor or circuit is further programmed to
perform a progress focus control for temporarily halting or slowing game progress in accordance with the detection of the occurrence of the action exchange.

12. The computer system as defined in claim 11, wherein controlling the display of the recommended candidate action includes presenting a plurality of recommended candidate actions in a selectable manner during the progress focus control, and
the at least one processor or circuit is further programmed to
cause the player character to perform a recommended candidate action selected by the player from the plurality of recommended candidate actions.

13. The computer system as defined in claim 1, wherein controlling the display of the recommended candidate action includes:
presenting a plurality of recommended candidate actions with a series of actions including a plurality of successive actions as a recommended candidate action; and
narrowing down the plurality of recommended candidate actions to a series of actions following an action, and updating content of the presentation in accordance with the narrowed-down recommended candidate action to present the narrowed-down recommended candidate action, when the player character performs the action in accordance with operation input by the player after the detection of the occurrence of the action exchange.

14. The computer system as defined in claim 2, wherein the at least one processor or circuit is further programmed to
perform a control for notifying an evaluation result to the player by evaluating an action performed by the player character after the end of the own stiff time, when the detection of the occurrence of the action exchange is performed and the own stiff time is shorter than the opponent stiff time.

15. The computer system as defined in claim 14, wherein the control for notifying the evaluation result includes evaluating an operation input timing related to the action of the player character after the end of the own stiff time.

16. The computer system as defined in claim 1, wherein controlling the display of the recommended candidate action includes displaying the recommended candidate action on the display during a video replay of the electronic video game.

17. The computer system as defined in claim 16, wherein controlling the display of the recommended candidate action includes setting a timing to present the recommended candidate action during the video replay based on a game progress result of the electronic video game.

18. A game system comprising:
a server system that is the computer system as defined in claim 1, the server system being configured to communicate with a player terminal to control execution of the electronic video game; and
the player terminal.

19. A computer system comprising:
at least one processor or circuit programmed to:
control execution of an electronic video game in which a player character and an opponent character have a real-time match, the player character performing an action based on a signal from a player terminal;
detect occurrence of an action exchange in which one of the player character and the opponent character performs a first action and another one of the player character and the opponent character performs a second action to mutually exchange the actions; and
control a display to display a recommended candidate action that is executable by the player character and recommended to be performed after an end of an own stiff time to the player terminal, based on the own stiff time related to the action performed by the player character, upon detection of the action exchange, the own stiff time being a predetermined length of time during which operations for controlling the player character that are input on the player terminal are not executed in the electronic video game.

* * * * *